(12) United States Patent
Gous

(10) Patent No.: US 7,782,773 B2
(45) Date of Patent: Aug. 24, 2010

(54) METRIC OPTIMIZATION FOR TRAFFIC ENGINEERING IN A METRIC-ROUTED NETWORK

(75) Inventor: Alan Thornton Gous, Palo Alto, CA (US)

(73) Assignee: Cariden Technologies, Inc., Mountain View, CA (US)

( * ) Notice: Subject to any disclaimer, the term of this patent is extended or adjusted under 35 U.S.C. 154(b) by 140 days.

(21) Appl. No.: 12/023,957

(22) Filed: Jan. 31, 2008

(65) Prior Publication Data

US 2008/0123534 A1 May 29, 2008

Related U.S. Application Data

(62) Division of application No. 10/937,988, filed as application No. PCT/US03/33116 on Oct. 17, 2003, now Pat. No. 7,505,413.

(60) Provisional application No. 60/419,368, filed on Oct. 18, 2002.

(51) Int. Cl.
*H04J 1/16* (2006.01)
*H04L 12/26* (2006.01)

(52) U.S. Cl. .................. 370/230; 370/234; 370/235

(58) Field of Classification Search ................ None
See application file for complete search history.

(56) References Cited

U.S. PATENT DOCUMENTS

| | | | |
|---|---|---|---|
| 6,011,776 A * | 1/2000 | Berthaud et al. | 370/232 |
| 6,098,107 A | 8/2000 | Narvaez-Guarnieri et al. | |
| 6,321,271 B1 | 11/2001 | Kodialam et al. | |
| 6,370,119 B1 | 4/2002 | Basso et al. | |
| 6,418,476 B1 | 7/2002 | Luciani | |
| 6,594,268 B1 * | 7/2003 | Aukia et al. | 370/400 |
| 6,724,722 B1 | 4/2004 | Wang et al. | |
| 6,728,748 B1 * | 4/2004 | Mangipudi et al. | 718/105 |
| 6,744,767 B1 * | 6/2004 | Chiu et al. | 370/395.21 |
| 6,760,314 B1 | 7/2004 | Iwata | |
| 6,765,873 B1 * | 7/2004 | Fichou et al. | 370/235 |
| 6,788,646 B1 * | 9/2004 | Fodor et al. | 370/230 |

(Continued)

FOREIGN PATENT DOCUMENTS

JP 200124699 5/1990

(Continued)

OTHER PUBLICATIONS

Nguyen, Brian N., "International Search Report", (May 20, 2004), 2 pages.

(Continued)

*Primary Examiner*—Raj Jain
(74) *Attorney, Agent, or Firm*—Schwegman, Lundberg & Woessner, P.A.

(57) ABSTRACT

A method is performed to optimize metrics associated with links of a network that is routed utilizing a shortest-path-first (SPF) routing method. The method includes identifying at least one failure scenario applicable to the network and identifying at least one bandwidth level scenario applicable to point-to-point demands routed through the network. A metric is automatically calculated for each of a plurality of links of a network, such that routings of demands through the network are optimized for the at least one failure scenario, and for the at least one bandwidth level.

18 Claims, 23 Drawing Sheets

U.S. PATENT DOCUMENTS

| | | |
|---|---|---|
| 7,505,413 B2 | 3/2009 | Gous |
| 2002/0141342 A1 | 10/2002 | Furman et al. |
| 2006/0050634 A1 | 3/2006 | Gous |

FOREIGN PATENT DOCUMENTS

| | | |
|---|---|---|
| JP | 10065687 | 3/1998 |
| JP | 10107794 A | 4/1998 |
| JP | 2000247087 | 9/2000 |
| JP | 2001237828 | 8/2001 |
| JP | 2002247087 | 8/2002 |
| JP | 2002271372 | 9/2002 |

OTHER PUBLICATIONS

"U.S. Appl. No. 10/937,988, Response filed Jul. 2, 2008 to Non Final Office Action mailed Mar. 3, 2008", 11 pgs.

"U.S. Appl. No. 10/937,988, Non-Final Office Action mailed Mar. 3, 2008", 9 pgs.

"U.S. Appl. No. 10/937,988, Preliminary Amendment mailed Jan. 31, 2008", 9 pgs.

"U.S. Appl. No. 10/937,988, Restriction Requirement mailed Dec. 14, 2007", 5 pgs.

"European Application Serial No. 03777689.5, EP Search Report mailed Apr. 22, 2008", 7 pgs.

"European Application Serial No. 03777689.5, Office Action mailed Jun. 25, 2008", 6 pgs.

"International Application Serial No. PCT/US03/33116, International Search Report mailed May 20, 2004", 5 pgs.

Coates, M., et al., "Internet Tomography", *Ieee Signal Processing Magazine, Ieee Service Center*, Piscataway, NJ, US, vol. 19(3), ISSN: 1053-5888, (May 2002), 47-65.

"U.S. Appl. No. 10/937,988, Notice of Allowance mailed Nov. 3, 2008", 8 pgs.

"U.S. Appl. No. 10/937,988, Response filed Jan. 14, 2008 to Restriction Requirement mailed Dec. 14, 2007", 8 pgs.

"Japanese Application Serial No. 2004-545527, Office Action mailed May 20, 2009", 16 pgs.

Yasutaka, Nagao, et al., "IP-QoS Server System", *NEC Technical Journal, NEC Corporation*, 53(11), (Nov. 24, 2000), 28-32.

"Japanese Application Serial No. 2004-545527, Office Action mailed Dec. 8, 2009", 11 pgs.

* cited by examiner

SHARED RISK LINK GROUPS STRUCTURE (230)

| SRLG NAME | 1.1 | 1.2 | 2.1 | 2.2 | 3.1 | 3.2 | 4.1 | 4.2 | ACTIVE? |
|---|---|---|---|---|---|---|---|---|---|
| NO FAILURE | | | | | | | | | YES |
| CIRCUIT 1 | X | X | | | | | | | YES |
| CIRCUIT 2 | | | X | X | | | | | YES |
| CIRCUIT 3 | | | | | X | X | | | YES |
| CIRCUIT 4 | | | | | | | X | X | YES |
| CONDUIT 1 | X | X | X | X | | | | | YES |
| NODE C | X | X | X | X | X | X | X | X | YES |

BANDWIDTH UTILIZATION STRUCTURE (240)

BANDWIDTH LEVEL UTILIZATION STRUCTURE
BANDWIDTH LEVEL = "1:00pm"
LINK UTILIZATIONS (%)

| SRLG NAME | 1.1 | 1.2 | 2.1 | 2.2 | 3.1 | 3.2 | 4.1 | 4.2 |
|---|---|---|---|---|---|---|---|---|
| NO FAILURE | 75 | 0 | 75 | 0 | 0 | 0 | 0 | 0 |
| CIRCUIT 1 | 0 | 0 | 150 | 0 | 0 | 0 | 0 | 0 |
| CIRCUIT 2 | 150 | 0 | 0 | 0 | 0 | 0 | 0 | 0 |
| CIRCUIT 3 | 75 | 0 | 75 | 0 | 0 | 0 | 150 | 150 |
| CIRCUIT 4 | 75 | 0 | 75 | 0 | 150 | 150 | 0 | 0 |
| CONDUIT 1 | 0 | 0 | 0 | 0 | 0 | 0 | 0 | 0 |
| NODE C | 75 | 0 | 75 | 0 | 0 | 0 | 0 | 0 |

BANDWIDTH LEVEL UTILIZATION STRUCTURE
BANDWIDTH LEVEL = "8:00am"

(UTILIZATION STRUCTURE OF OTHER BANDWIDTH LEVELS)

*Fig. 2B*

Example Network Demands Structure — 800

| Number | Source Node(s) | Destination Node(s) | Bandwidth (Mb/s) |
|---|---|---|---|
| 1 | ER1.A | CR1.B | 10 |
| 2 | ER2.A | CR1.B | 10 |
| 3 | ER3.A | CR1.B | 10 |
| 4 | PR1.A | CR1.B | 10 |
| 5 | CR1.B | Network P | 10 |

Corresponding Core Demands Structure — 805

| Number | Source Node(s) | Destination Node(s) | Bandwidth (Mb/s) | Network Demands Aggregated |
|---|---|---|---|---|
| 1 | CR1.A | CR1.B | 10 | 1 |
| 2 | CR1.A, CR2.A | CR1.B | 30 | 2,3,4 |
| 3 | CR1.B | CR1.C, CR2.C, CR1.A, CR2.A | 10 | 5 |

*Fig. 8*

Table of Utilizations under No-failure SRLG for steps in example changeover — 1400

| Step | Utilizations (%) Link 1.1 | 1.2 | 2.1 | 2.2 | 3.1 | 3.2 | 4.1 | 4.2 |
|---|---|---|---|---|---|---|---|---|
| 0 | 75 | 0 | 75 | 0 | 0 | 0 | 0 | 0 |
| 1 | 75 | 0 | 75 | 0 | 0 | 0 | 0 | 0 |
| 3 | 50 | 0 | 50 | 0 | 50 | 0 | 50 | 0 |
| 0 | 75 | 0 | 0 | 0 | 75 | 0 | 75 | 0 |

Changeover Sequence structure for example changeover — 1405

| Step 1 | ChangeMetric | Link = 3.1 | New Metric = 5 |
|---|---|---|---|
| Step 2 | ChangeMetric | Link = 4.1 | New Metric = 5 |
| Step 3 | Deactivate | SRLG = Circuit 2 | |

*Fig. 14*

REPORT_US_WAN_LATENCY_METRICS.PLN

| NETWORK SUMMARY | SIMULATION SUMMARY | FAILURES | CIRCUITS | INTERFACES | DEMANDS | TUNNELS |

INTERFACE USAGE: TOTAL

| NODE | REMOTE NODE | INTERFACE | CIRCUIT | AVAILABLE | UTIL (%) | WC AVAILABLE | WC UTIL (%) | WC FAILURE | WC BW LEVEL |
|---|---|---|---|---|---|---|---|---|---|
| cr2.wdc | cr1.nyc | | cr1.nyc.cr2.wdc | 2488.0 | 110.14 | 2488.0 | 110.14 | circuit.cr1.key.cr1.wdc | Peak |
| cr1.wdc | cr1.key | | cr1.key.cr1.wdc | 2488.0 | 0.0 | 2488.0 | 106.7 | circuit.cr1.nyc.cr2.wdc | Peak |
| cr2.nyc | cr1.chi | | cr1.chi.cr2.nyc | 2488.0 | 102.44 | 2488.0 | 102.44 | circuit.cr1.key.cr1.wdc | Peak |
| cr1.nyc | cr2.wdc | | cr1.nyc.cr2.wdc | 2488.0 | 96.97 | 2488.0 | 96.87 | circuit.cr1.key.cr1.wdc | Peak |
| cr1.key | cr1.wdc | | cr1.key.cr1.wdc | 2488.0 | 0.0 | 2488.0 | 95.84 | circuit.cr1.nyc.cr2.wdc | Peak |
| cr1.chi | cr2.nyc | | cr1.chi.cr2.nyc | 2488.0 | 88.65 | 2488.0 | 88.65 | circuit.cr1.key.cr1.wdc | Peak |
| cr1.sic | cr1.key | | cr1.sic.cr1.key | 2488.0 | 0.0 | 2488.0 | 83.01 | circuit.cr2.chi.cr1.sic | Peak |
| cr1.wdc | cr2.ati | | cr2.ati.cr1.wdc | 2488.0 | 42.46 | 2488.0 | 77.47 | circuit.cr2.ati.cr2.sic | Peak |
| cr1.key | cr1.sic | | cr1.sic.cr1.key | 2488.0 | 0.0 | 2488.0 | 76.78 | circuit.cr2.chi.cr1.sic | Peak |
| cr1.nyc | cr2.bos | | cr2.bos.cr1.nyc | 2488.0 | 25.23 | 2488.0 | 74.63 | circuit.cr1.chi.cr2.nyc | Peak |
| cr1.sic | cr2.chi | | cr2.chi.cr1.sic | 2488.0 | 73.87 | 2488.0 | 73.87 | circuit.cr1.key.cr1.wdc | Peak |
| cr1.key | cr2.chi | | cr2.chi.cr2.key | 2488.0 | 413.0 | 2488.0 | 71.31 | circuit.cr1.nyc.cr2.wdc | Peak |

METRIC OPTIMIZATION FOR TRAFFIC ENGINEERING IN A METRIC-ROUTED NETWORK

This application is divisional of U.S. application Ser. No. 10/937,988 filed Sep. 9, 2004 now U.S. Pat. No. 7,505,413, which claims the benefit of the filing date of U.S. provisional patent application No. 60/419,368, filed Oct. 18, 2002, and PCT application no. PCT/US03/33116, filed on Oct. 17, 2003, the entire content of each of the applications being incorporated herein by reference.

TECHNICAL FIELD OF THE INVENTION

Embodiments relate generally to the field of networking.

BACKGROUND

The shortest-path-first (SPF) routing method is used in a variety of data networks to determine the path data should be routed from any source node to any destination node in the network. Examples of data networks that use the SPF routing method are Internet Protocol (IP) networks using OSPF or IS-IS versions of the Interior Gateway Protocol (IGP).

The nodes in an SPF-routed network are connected by unidirectional links. Each link is assigned a positive number called a metric. The length of any path through the network is defined to be the sum of the metrics on the links comprising that path. Data traveling from a source node to a destination node travels along the shortest path, according to this definition, between these two nodes. If more than one path is of equal cost, the data load, or bandwidth, is shared in some manner between these equal-cost paths.

The choice of network metrics, then, determines the routing of data through the network. Certain choices of routings through a given network may be more desirable than others. Metric-based traffic engineering is the process of choosing metrics to achieve desirable routings. Certain routings may be preferred over others for any of a number of reasons, for example:

1. To keep the bandwidth utilization (e.g., the percentage of link capacity utilized) below a certain percentage, or as low as possible, for each link in the network, to prevent congestion.
2. To keep bandwidth utilization below a certain percentage, or as low as possible, for each link in the network, even when certain elements of the network (links or nodes, for example) fail, or are purposefully deactivated, and bandwidth must be routed elsewhere through the network.

Two aspects of this field have been the subjects of some prior academic research:

1. Estimation of point-to-point bandwidth demands in a network from measurements of link utilizations. See, for example, "An Information-Theoretic Approach to Traffic Matrix Estimation", by Yin Zhang, Matthew Roughen, Carsten Lund, and David Donoho, *ACM SIGCOMM* 2003. Knowledge of the point-to-point demands is necessary to calculate future link utilizations under modifications to the metrics and/or the topology of the network.
2. Algorithms for selecting metrics in a network to avoid congestion through over utilization of links under normal network operation. See, for example, Traffic engineering with traditional IP routing protocols, IEEE Communications Magazine, 40(10): 118-124, 2002.

BRIEF DESCRIPTION OF THE DRAWINGS

The present invention is illustrated by way of example and not limitation in the figures of the accompanying drawings, in which like references indicate similar elements and in which

FIG. 8 is a diagrammatic representation of two exemplary demand structures.

FIG. 14 is a diabetic representation of a changeover sequence structure, and a table of utilization of links in a network and the each step of a changeover sequence, according to one exemplary embodiment of the present invention FIGS. 18-21 illustrate exemplary interfaces that may be generated and presented by a GUI, in one exemplary embodiment if the present invention

DETAILED DESCRIPTION

Figure 1:
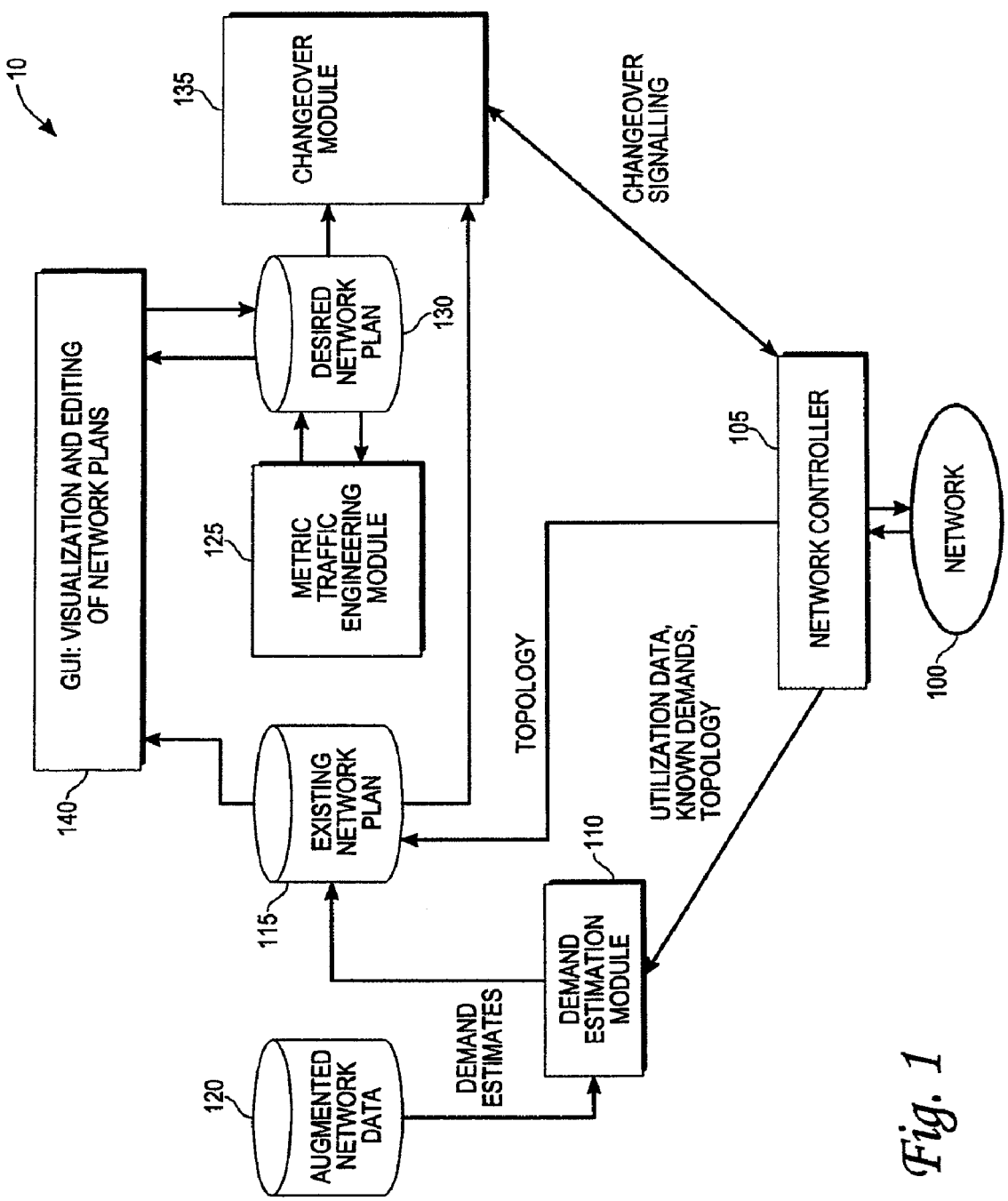
FIG. 1 is a block diagram illustrating a traffic engineering system, according to an exemplary embodiment of present invention

An exemplary traffic engineering system, and various exemplary methods and functions performed by the system, are described. In the following description, for purposes of explanation, numerous specific details are set forth in order to provide a thorough understanding of the present invention. It will be evident, however, to one skilled in the art that the present invention may be practiced without these specific details FIG. 1 is a block diagram illustrating a traffic engineering system 10, according to one exemplary embodiment of the present invention. The arrows in the diagram represent direction of data flow through the system 10.

An exemplary network 100 is an SPF-routed telecommunications network on which the system 10 performs traffic engineering through the manipulation of link metrics and/or the activation or deactivation of various elements or sets of elements in the network 100.

A network controller 105 operates to extract configurations and utilization measurements from the network 100, and to perform configuration changes on the network 100. The network controller 105, for example, may be one or more of:
1. Specialized software and/or hardware to perform these tasks automatically,
2. A human network controller who is able manually to interact with the network 100 to extract the necessary information or modify the network configurations, or
3. Software and/or hardware within the network 100 themselves, able to perform the measurement and control functions required.

The network controller 105 constructs a data structure, conveniently termed an existing network plan 115. The existing network plan 115 is used by a Graphical User Interface (GUI) 140, and a metric traffic engineering module 125, to construct a desired network plan 130. Both the existing network plan 115 and the desired network plan 130 are inputs to a changeover module 135, which constructs a changeover sequence (e.g., a sequence of network topology and metric configuration changes to move the network 100 from an existing to a desired configuration). The changeover sequence created by the changeover module 135 is then signaled to the network controller 105, which implements the changes, step-by-step, on the network 100.

The existing network plan 115 is a data structure constructed using:
1. Information about the topology of the network 100, obtained directly from the network controller 105.
2. Information about the point-to-point bandwidth demands in the network 100, obtained from a demand estimation module 110 if such information not available to be read directly from the network 100 via the network controller 105. Otherwise, this information may be obtained from the network controller 105.
3. Extra network plan information, conveniently labeled augmented network data 120, which is not available directly from the network 100 via the network controller 105. This augmented network data 120 may consist, for example, of various Shared Risk Link Groups (SRLGs) in the network 100 (e.g., the groups of links that have been determined to have some reasonable probability of failing together).

The GUI 140 provides a human user with a representation of the existing network plan 115, to allow understanding of the current state of the network 100. The GUI 140 also helps in the creation of the desired network plan 130. The desired network plan 130 may, for example, differ from the existing network plan 115 in the following ways:
1. Some SRLGs, which are active (e.g., all component elements functioning correctly) in the existing network plan 115, are inactive (e.g., none of the component elements functioning) in the desired network plan 130. This change in the desired network plan 130 is made by a human user through the GUI 140. For example, if the user wishes to remove a node from the network 100 for maintenance purposes, the user may create a desired network plan 130 in which the relevant node is deactivated, and use a metric traffic engineering module 125 to determine a set of metrics for the desired network plan 130, under which deactivation of the relevant node has the least serious impact on link utilizations. The changeover module 135 then determines the order in which the metric changes and the node deactivation should take place to move to the desired network plan 130 with minimal disruption to the network 100.
2. Some SRLGs, which are inactive in the existing network plan 115, are active in the desired network plan 130. This change in the desired network plan 130 may be made by a human user through the GUI 140. For example, assume that the user has deactivated a node as in 1. above, and wishes to reactivate the node once maintenance is complete. The existing network plan 115 is the desired network plan 130 in 1, and the desired network plan 130 is the existing network plan 115 in 1. The changeover module 135 will then determine the order in which the changes to metrics, and the reactivation of the node should be performed, in order to move back the network 100 back to its original configuration.
3. Some metrics may differ in the existing network plan 115 from those in the desired network plan 130. This may be as a result of the metric traffic engineering module 125 changing the metrics of the desired network plan 130 to improve the utilization characteristics of the network 100, or the metrics may be manually changed by the user of the GUI 140. The changeover module 135 can then determine the order in which these metrics should be changed on the network 100 itself.

Figure 2A:
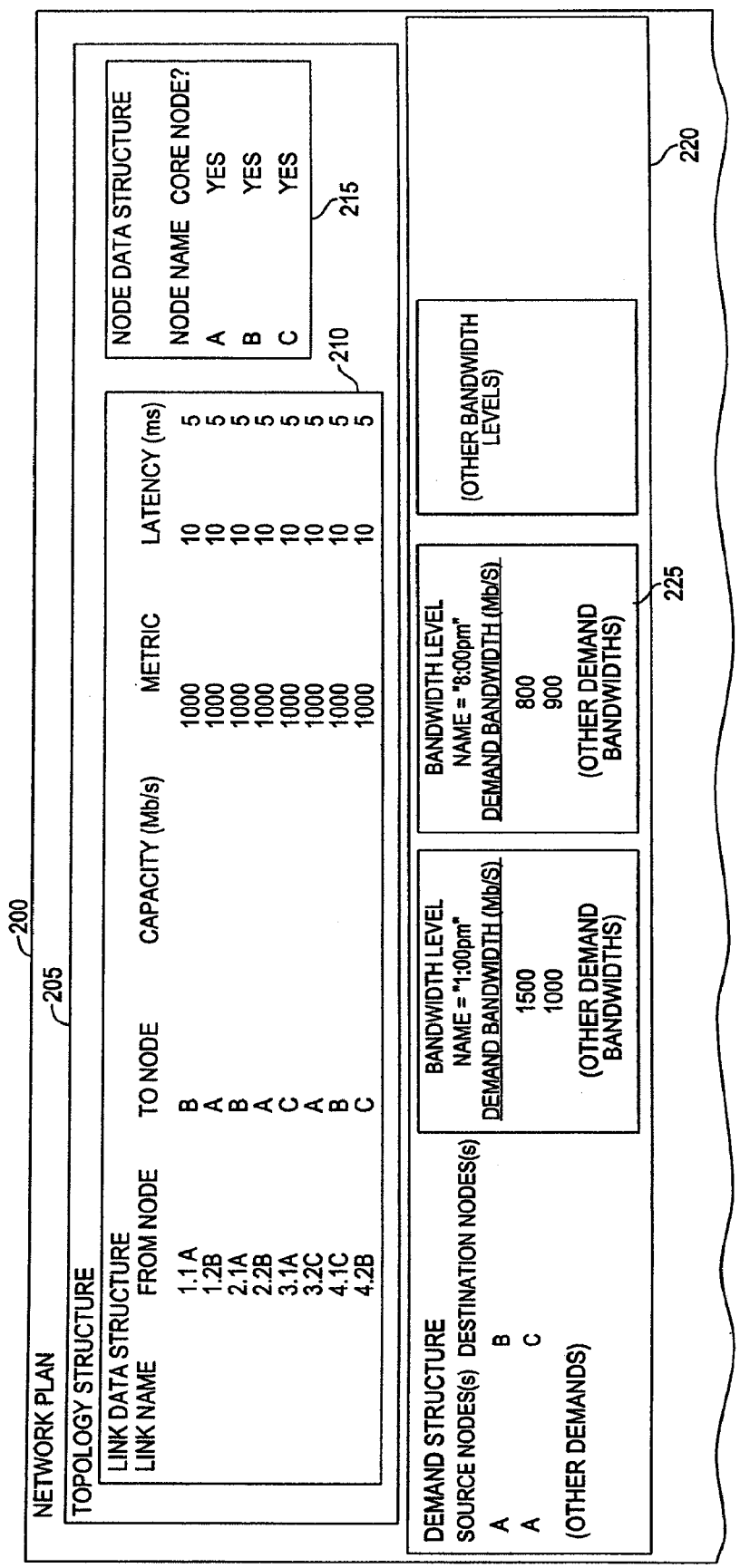
FIG. 2 is a diagrammatic representation of a network plan data structure, according to an exemplary embodiment of the present invention, which may be utilized to store information concerning an existing and a desired network plan

FIG. 2 illustrates a network plan data structure 200, according to an exemplary embodiment of the present invention, which is used to store information about both the existing network plan 115 and the desired network plan 130.

The exemplary network plan structure 200 includes a topology structure 205, a demand structure 220, a shared risk link groups structure 2030, and a bandwidth utilization structure 235.

The topology structure 205 contains information about a network topology, for example the physical structure of the network 100 and its internal configurations. The topology structure 205 is also shown to comprise a link data structure 210 and a node data structure 215. The link data structure 210 lists the links in the network 100. The network links are unidirectional, from one node to another node in the network 100. For each link in the network 100, the link data structure 210 records a link name, the node from which the link originates (From Node), the node at which the link terminates (To Node), the capacity of the link, expressed for example in Megabits per second (Mb/s), a link metric, a latency of the link, and whether or not the link is a core link. The latency of the link is the time (e.g., expressed in milliseconds (ms)) that data takes to traverse the relevant link. The concept of a core link will be explained in further detail below. The node data structure 215 lists the nodes in the network 100. For each node in the network 100, the node data structure 215 lists a node name and whether or not the node is a core node. The concept of a core node will also be described in further detail below.

Turning now to the demand structure 220, this structure 220 contains a list of bandwidth demands through the network 100. A bandwidth demand may be a real or hypothesized bandwidth level that does (or may) flow from a source node or set of source nodes in the network 100 to a destination node or set of destination nodes in the network 100. Each bandwidth demand consists of a set of source nodes and a set of destination nodes, together with one or more bandwidth levels 225 associated with the demand. Each bandwidth level 225 consists of a bandwidth level name, and the bandwidth level itself, expressed in megabits per second (Mb/s). A demand may contain more than one bandwidth level 225 to represent, for example, different bandwidth levels at different times of the day, or different hypothesized bandwidth levels if the demand bandwidth is not known exactly but is being estimated from measurements on the network 100.

The Share Risk Link Groups (SRLGs) structure 230 contains definitions of one or more SRLGs on the network 100. SRLGs are, in the exemplary embodiment, sets of network links that have some non-negligible probability of all failing at the same time. For example, an SRLG may be a circuit in the network 100 that connects two nodes and contains two links, one connecting the nodes in one direction, and the other connecting the nodes in the reverse direction. In typical IP networks, if one of these links fails, for example through the failure of the link interface card on the node from which the link originates, the other will fail too. Thus, the failure of the two together should be considered. Another example of an SRLG is all links originating and terminating at a particular node. If that particular node were to fail or be deactivated, all these links would simultaneously become inactive. Yet another example of an SRLG is a group of links within a group of circuits that all lie along the same physical conduit. If the conduit is physically cut, then all these links will fail simultaneously.

The SRLGs structure 230 thus lists a number of SRLGs, and indicates which links are included in these SRLGs. In the example data used to illustrate the exemplary network plan structure 200, there are four circuits, one conduit, and a node that can fail. These are described in FIG. 3.

For each SRLG listed in the SRLGs structure 230, a flag indicates whether or not the relevant SRLG is active. These flags allow topology differences to be indicated between two different network plan structures (for example, the existing and desired network plans 115 and 130) that have identical topology structures. If an SRLG is inactive, it indicates that, for routing purposes, the links in the SRLG do not exist in the network 100.

In one exemplary embodiment of the present invention, one SRLG listed in the SRLGs structures may be regarded as a special case, and is always listed: the "No Failure" SRLG. This special case SLRG may be an empty SRLG, containing no links. The special case SRLG is provided for convenience, so that operations that loop through the SRLGs one at a time to calculate network behavior, under different failure scenarios, will include the no-failure scenario as one of those scenarios.

The bandwidth utilization structure 235 may, in one exemplary embodiment of the present invention, be calculated from the rest of the network plan structure 200 in a manner that will be described below with reference to FIG. 4. For each bandwidth level named in the demand structure 220, a bandwidth level utilization structure 240 is included in the bandwidth utilization structure 235. For every link in the network 100, and for every SRLG listed in the SRLG structure 230, of the bandwidth utilization structure 235 records the percentage bandwidth utilization of a particular link, with the demands in the demand structure 220 routed through the network 100 in which the links in the SRLG are inactive.

Figure 3:
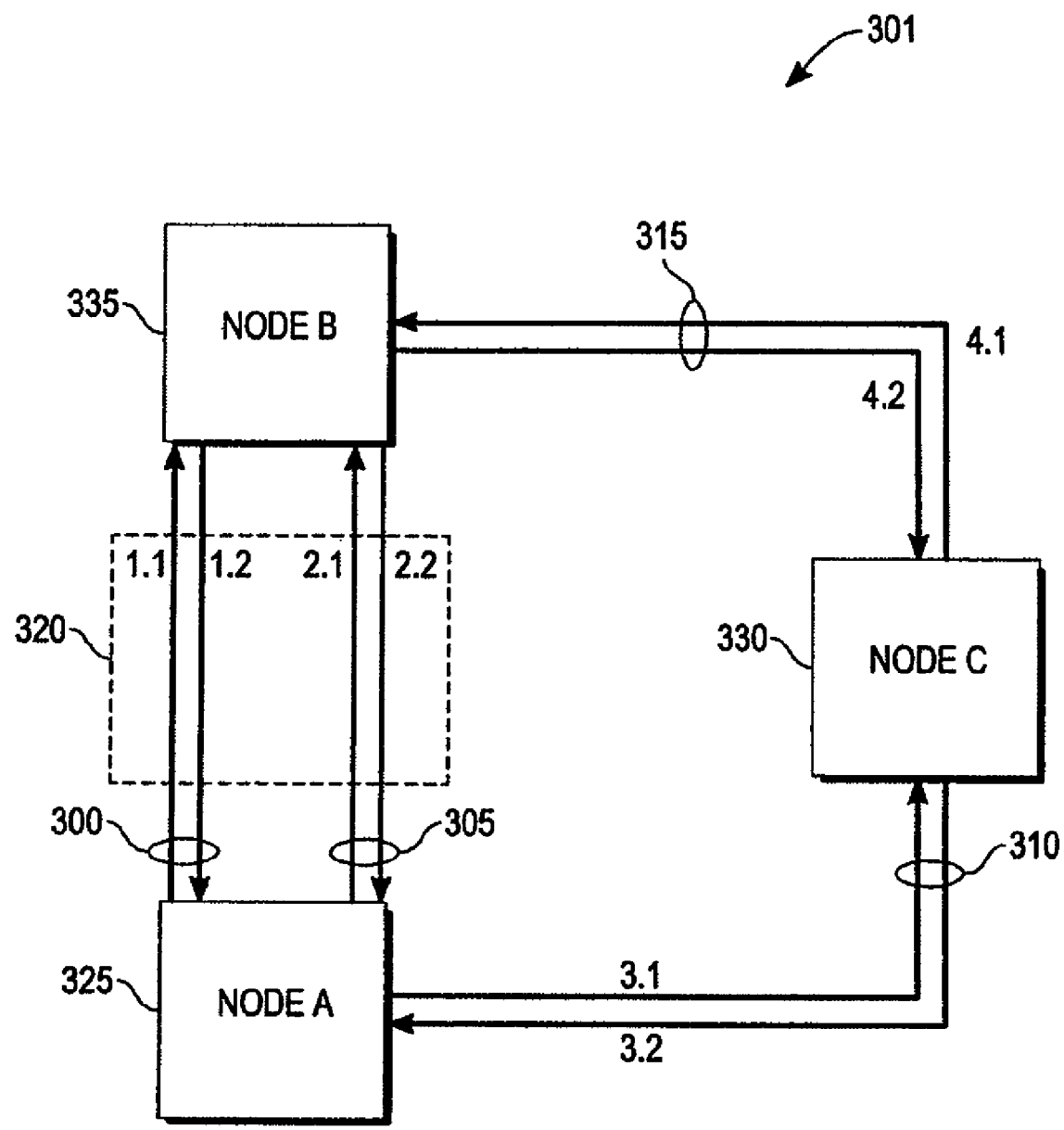
FIG. 3 is a diagrammatic representation of an exemplary network to which the network plan structure, depicted in FIG. 2, pertains.

FIG. 3 illustrates an exemplary network 301 to which the data, in the network plan structure 200 depicted in FIG. 2, pertains. Three nodes in the network 301, A, B and C, are depicted as 325, 335, and 330. Each link listed in the link data structure 210 is depicted here as an arrow from an originating node to a terminating node of the link. There are four links shown connecting Node A and Node B, in two pairs. A first pair of links of 300 comprises Circuit 1 in the list of SRLGs in the SRLG structure 230 shown in FIG. 2. A second pair of links 305 similarly comprises Circuit 2. Circuit 3 and Circuit 4 are illustrated as the pairs of links 310 and 315. The four links in 310 and 315 make up the SRLG labeled Node C, since they are the set of links originating or terminating at Node C, and are therefore the links that would fail if Node C were to fail. The four links comprising 300 and 305 also together form an SRLG 320, which represents a single conduit that the two circuits 300 and 305 both lie in, as they connect Node A and Node B along the same physical route.

Figure 4:
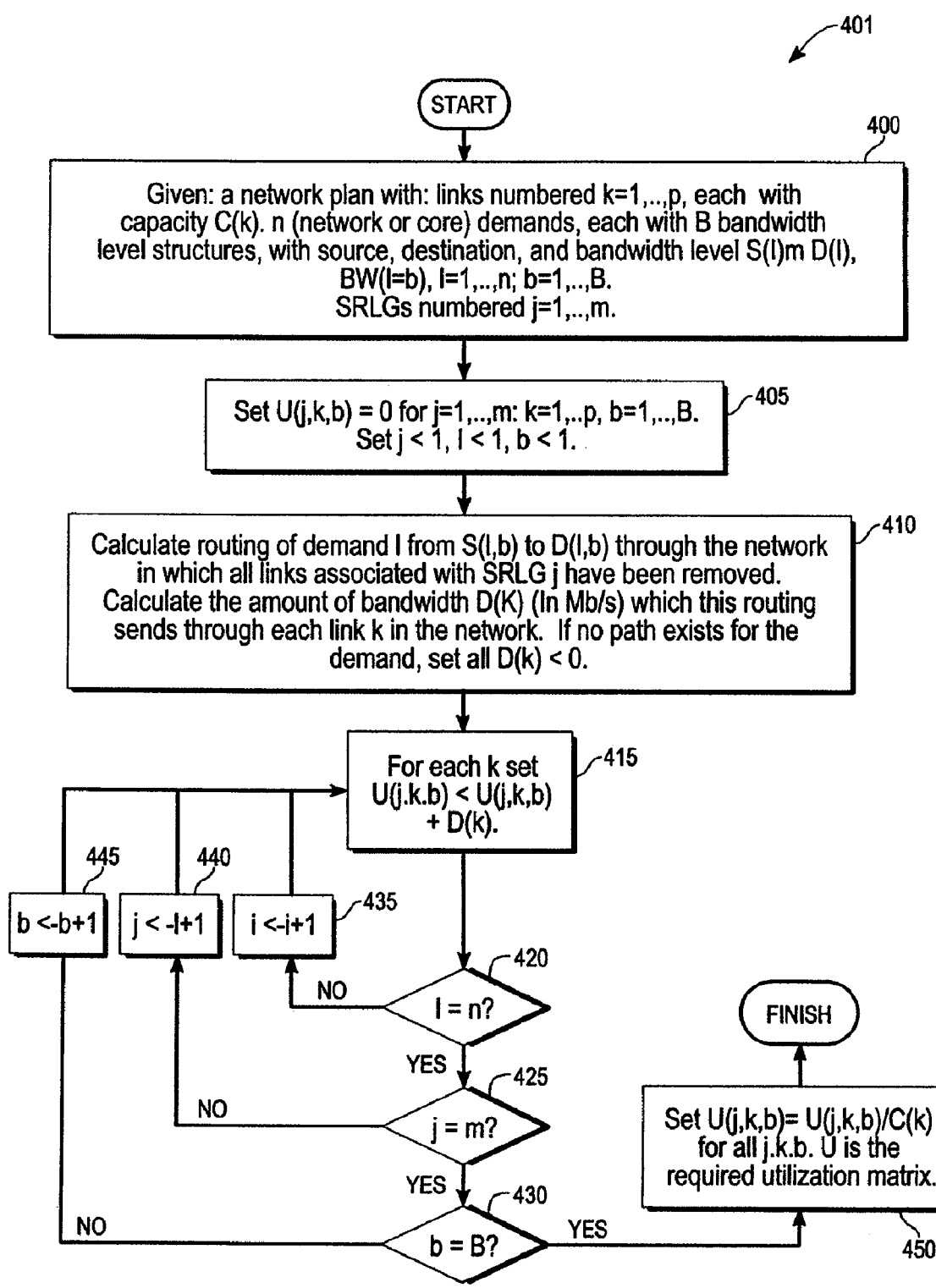
FIG. 4 is a flowchart illustrating a method, according to an exemplary embodiment of the present invention, to calculate a bandwidth utilization structure for a network plan structure

FIG. 4 is a flowchart depicting a method 401, according to an exemplary embodiment of the invention, for the calculation of a bandwidth utilization structure 235, of a network plan structure 200, from the other components of the bandwidth utilization structure 235, namely the topology structure 205, the demand structure 220, and the shared risk link groups structure 230.

In block 400, a notation is specified to represent the given network plan. The network plan has links numbered $k=1, \ldots, p$, each with capacity $C(k)$. The demand structure 220 contains demands $i=1, \ldots, n$, each with B bandwidth levels, $b=1, \ldots, B$. The source node(s) and destination node(s) are specified as $S(i)$ and $D(i)$, $i=1, \ldots, n$. The bth bandwidth level for the ith demand is given by $bw(i,b)$. The SRLGs in the SRLG structure 230 are numbered $j=1, \ldots, m$.

In block 405, the array U that will store the bandwidth utilization structure 235 is initialized to 0. That is, $B(j,k,b)$ is set to 0 for all SRLGs $j=1, \ldots, m$, links $k=1, \ldots, p$, and bandwidth levels $b=1, \ldots, B$. The counters i, j and b are set to 1. These will index demands, SRLGs, and bandwidth levels respectively.

In block 420, the shortest-path routing of demand i is calculated from source nodes $S(i)$ to destination nodes $D(i)$ through the network 100 in which the links associated with SRLG j have been removed. The shortest-path is calculated using the metrics on each of the links in the topology. Any of a number of well-known algorithms may be used for this, including, for example, Dijkstra's algorithm. If there is more than one shortest path from a source node to a destination node, various methods of splitting flow between these shortest paths exist, and the method 401 here imitates the method used by the network 100 that is being modeled. For example, the equal-cost multipath (ECMP) algorithm might be used, in which flow is split evenly between all paths of equal length.

The routing taken by the demand determines how much the demand utilizes each link in the network 100. $D(k)$, for k from 1 to p, is set to be the utilization in Mb/s of this demand i through link k.

In block 415, the vector D of utilizations for demand i, with SRLG j failed, and bandwidth level b, is added to the bandwidth level utilization structure 240.

Blocks 420, 425, 430, 435, 440 and 445 facilitate looping through block 410 once for every combination of i from 1 to n, j from 1 to m, and b from 1 to B. That is, for each demand, SRLG, and bandwidth level.

Finally, once all looping is complete, block 450 converts the utilizations, expressed in U in Mb/s, to utilizations in percentages of the capacity of each link. Each entry in U is divided by the capacity of the corresponding link in the network. The resulting U is then the desired utilization structure.

Figure 5:
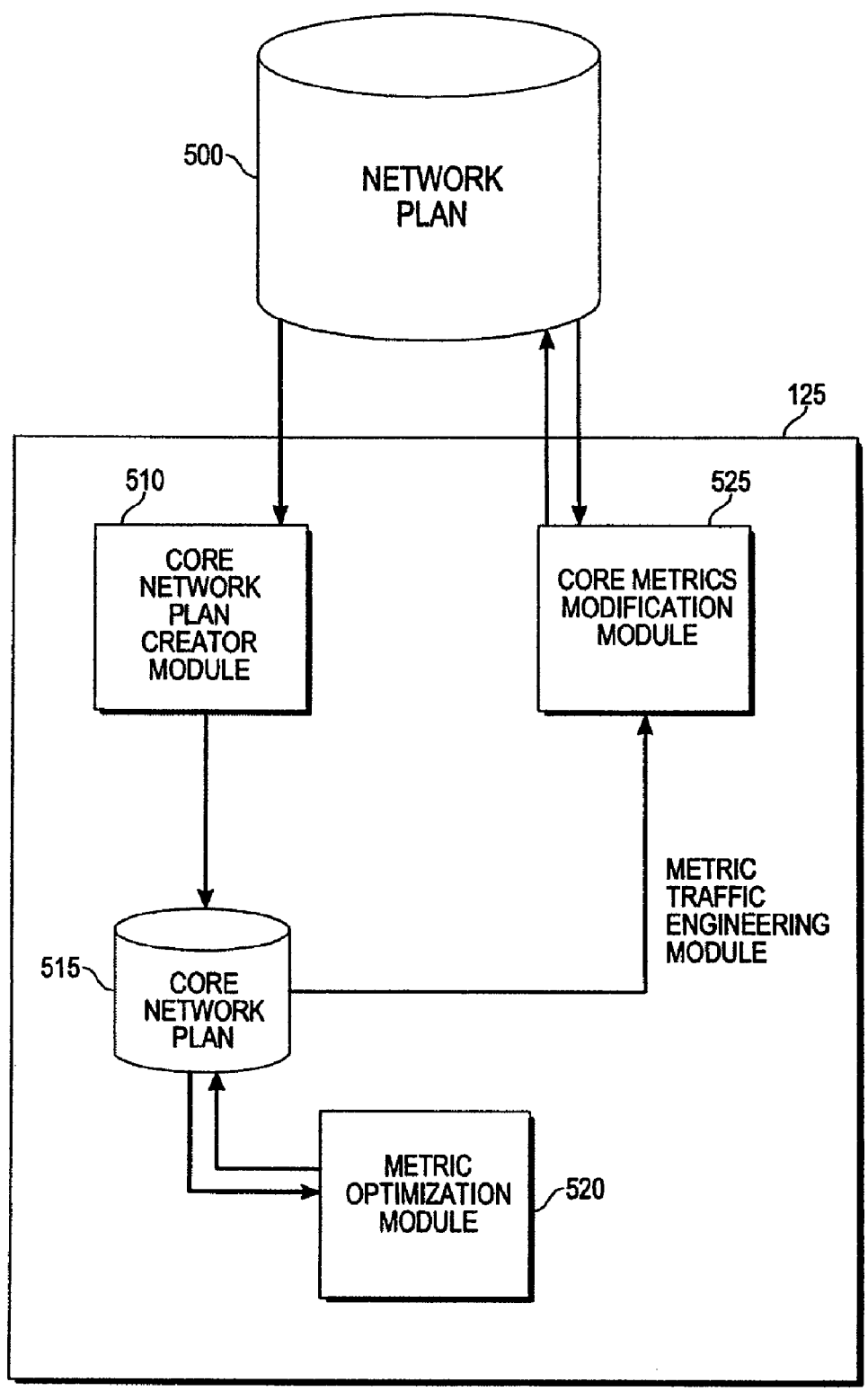
FIG. 5 is a block diagram illustrating architectural details of a metric traffic engineering module, according to an exemplary embodiment of the present invention

FIG. 5 is a block diagram providing further details regarding the architecture of the metric traffic engineering module 125, according to an exemplary embodiment of the present invention. Further details regarding the various functions performed by the metric traffic engineering module 125 will now be described with reference to FIG. 5.

An existing network plan 500 is input into the metric traffic engineering module 125. The metric traffic engineering module 125 operates to replace some or all of the link metrics in the existing network plan 500 to improve the resulting routings of the plan demands.

For the purposes of explanation, consider that the links of a typical telecommunications network can be divided into core nodes and non-core nodes. A link connecting two core nodes is a core link, otherwise it is a non-core link. The traffic engineering process performed by the metric traffic engineering module 125, in one exemplary embodiment of present invention, operates by changing only the metrics in the core links. This may serve to reduce the complexity of the optimization challenge, by reducing the number of variables that may be modified. Also, it is often the case that the metrics of non-core links (e.g., edge links or peering links) are standardized throughout a network and cannot be changed without violating the configuration policy of the network. Also, by restricting optimization to the core of the network, it is possible to aggregate demands together that originate outside of the core into a smaller number of demands through the core, further reducing the complexity of the optimization challenge. To this end, the metric traffic engineering module 125 is shown to include a core network plan creator module 510, which converts the existing network plan 500 into a core network plan 515 containing only core nodes, links and demands, in a manner that will be described in FIGS. 6, 7 and 8.

It should be noted that, in an alternative embodiment of the present invention, it might be possible to define an entire network as the core, in which case the modules 510 and 525 become irrelevant.

As noted above, the core network plan creator module 510 creates the core network plan 515 which, for the purposes of explanation, is considered to be the network plan structure 200 described above with reference to FIG. 2. A metric optimization module 520, according to an exemplary embodiment of present invention, takes the core network plan 515 as input, and changes the metrics in core network plan 515 to a more optimal set of metrics. The corresponding core link metrics are then changed by the core metric modification module 525 in the original network plan 500. The core network plan creator module 510 may also create the core network plan 515 in such a way that metric changes which are advantageous to the routing of the core network plan 515 are equally advantageous to the routings through the core component of the original network plan 500.

Figure 6:
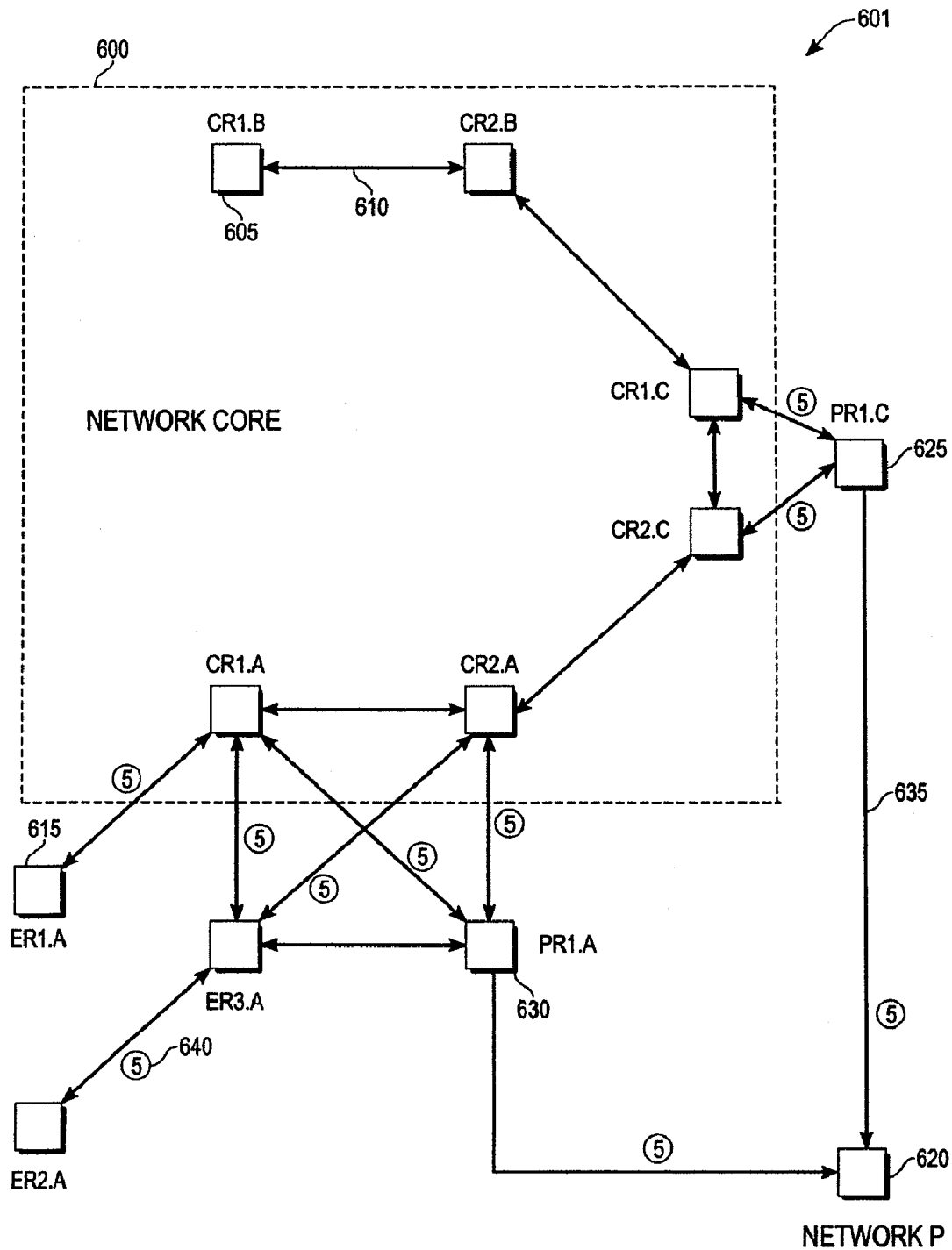
FIG. 6 is a diagrammatic representation of an exemplary network, and illustrates how an exemplary core network plan module creates a core network plan

FIG. 6 is a diagrammatic representation of an exemplary network 601, and illustrates how the core network plan module 510 creates, according to one exemplary embodiment of present invention, a core network plan 515. FIG. 6 also illustrates the various non-core elements in an exemplary telecommunications network.

Each of the nodes in the network 601 is defined as either a core node or a non-core node, in a network plan structure 200. In FIG. 6, the nodes enclosed in a network core 600 have been defined as core nodes, while those outside the network core 600 are non-core nodes. For example, node 615 is a non-core node and node 605 is a core node. Bi-directional arrows, such as arrow 610, represent circuits containing two links, one in each direction. Unidirectional arrows, such as arrow 635, illustrate links. Links that connect two core nodes are defined to be core links (e.g., the two links in 610); otherwise the relevant nodes are non-core links (e.g., link 635). Circles numbers next to circuits or links, for example circle number 640, each represent the metrics of the links in the circuits or the links themselves. Edge nodes, such as the node 615, act as sources and destinations for demands originating and terminating within the exemplary network 601.

Telecommunications networks are typically peered with one another, so that each carries traffic originating in another network, or destined for other networks. Network administrators are able to alter their peering arrangements to control to a certain extent where data from other networks enters into their network, and where data from their network exits into other networks.

Network peering can be represented in a network plan structure 200 by including a special node to represent each peered network. Node 620 is an example of a "special noted" that represents a peered network. Specifically, the node 620 represents a peered network that can be accessed either through node 625 or through node 630 in the exemplary network 601. A demand in the exemplary network 601, destined for a destination in the peered network, will exit from node 630 or node 625, depending on which is on the shortest path to the destination 620 from the source in the exemplary network 601. Thus, by changing the metrics inside the network 601, influence can be exerted over whether the last node the data flows through on its way to the peered network is node 625 or node 630.

If a peered network is the source of a demand into the exemplary network 601, however, influence cannot be exerted, by means of metric changes internal to the network 601, on the first node the data flows through in the network 601. In the example, data originating at the node 620 may flow through the node 630 or the node 625 into the network 601, but this is cannot be changed by changing metrics within the network 601.

One conclusion is that, to model a demand originating in the peered network represented by the node 620 in the network plan structure 200 for example, the source node would be specified as either the node 630 or the node 625, depending on where the traffic enters the network 601. However, to model a demand with destination the peered network, represented by the node 620, the destination node may be specified as the node 630, and the metric choices in the network 601 will determine which of the two paths are taken to the peered network (node 620).

Figure 7:
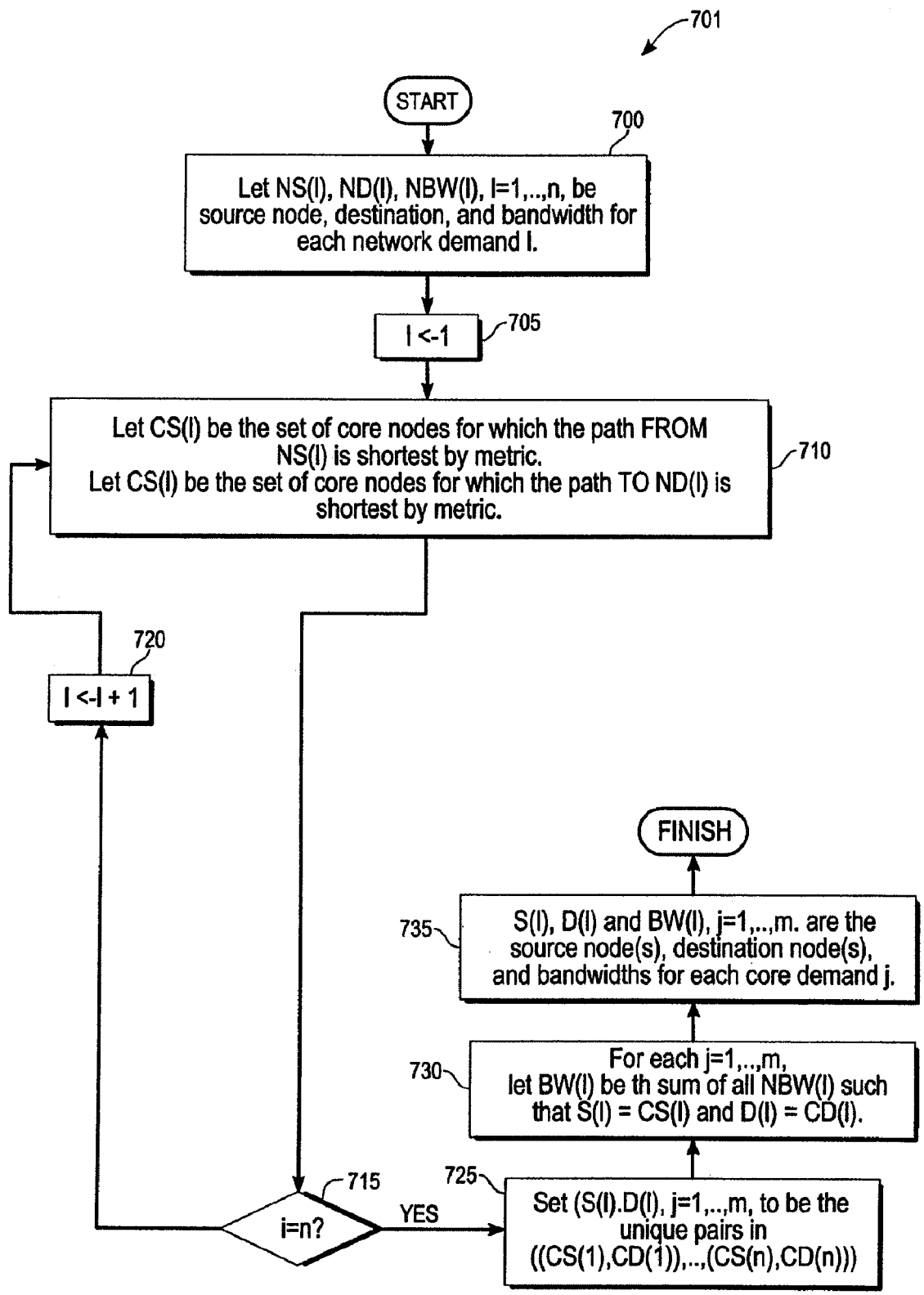
FIG. 7 is a flowchart illustrating a method, according to an exemplary embodiment of the present invention, which may be implemented by a core network plan creator module to create a demand structure

FIG. 7 is a flowchart showing an algorithm 701, according to exemplary embodiment of present invention, that may be used by the core network plan creator module 510 to construct a new demand structure 220, which replaces an existing demand structure 220 in the network plan 500. The new network demand structure 220 regards sources and destinations of the demands are core nodes. This enables a core network plan 515 to be constructed such that all non-core nodes and non-core links have been removed, so that metric optimization in 520 can be restricted just to the metrics in the core links.

Block 700 describes the notation for representing the inputted (e.g., existing) network demand structure 220 in the flowchart. For each i=1, . . . , n, NS(i), ND(i) and NBW(i) are, respectively, the source node, destination node, and bandwidth level for each demand in the existing network demand structure 220. In block 705, the counter i is set to 1.

Block 710 sets CS(i) to be the set of core nodes, in a subject network, which are shortest in metric distance from the node NS(i). For example, if NS(i) is node 630 in FIG. 6, CS(i) is set to the set {CR1.A, CR2.A} since these two core nodes are both of distance 5 away from node 630, and are therefore the closest core nodes from node 630.

Block 710 also sets CD(i) to be the set of core nodes in the subject network, which are shortest in metric distance to the node ND(i). For example, if ND(i) is node 620 in FIG. 6, CD(i) is set to the set {CR1.A, CR2.A, CR1.C, CR2.C}, since these four core nodes are all of distance 10 away from node 620, and are therefore the closest core nodes from node 620.

Block 715 checks whether the counter i has reached n, the total number of network demands. If not, block 720 increments i and the loop through 710 continues. If i=n, flow passes to block 725.

Block 725 constructs a set of all unique pairs in the list of source and demand pairs {(CS(1), CD(1)), . . . , (CS(n),CD(n))}. m is set to the length of this list of unique pairs, denoted (S(j),D(j)), for j=1, . . . , m.

For each unique pair (S(j),D(j)) for j from 1 to m, block 730 calculates the bandwidth BW(j) to be the sum of all bandwidths NBW(i) corresponding to all the source and destination pairs (CS(i),CD(i)) that are equal to (S(j),D(j)).

In this way, m demands with unique source and destination node sets are constructed, which are aggregates of all the inputted network demands, which enter and leave the network core 600 from the same sets of core nodes. In block 735, the vectors S, D, and BW represent the source node sets, destination node sets, and aggregated bandwidth for each of these aggregated demands. This concludes the algorithm 701 represented in the flowchart.

FIG. 8 shows two exemplary demand structures 800 and 805, which correspond in structure to the demand structure 220 described above with reference to FIG. 2. The first demand structure 800 contains an example list of demands through the exemplary network 601 represented in FIG. 6. The second demand structure 805 contains these demands as they would be aggregated by core network plan creator module 510, utilizing, for example, the algorithm 701 described in FIG. 7, into demands between sets of core routers.

The first demand in the first demand structure 800, from ER1.A to CR1.B, is converted into a demand from CR1.A to CR1.B in the second demand structure 805, since CR1.A is the single closest core node to ER1.A in the exemplary network 601.

All of the next three demands have sources that are closest to the same set of core routers, namely {CR1.A, CR2.A}. Their destination nodes are also all closest (e.g., in a trivial sense) to the same core router CR1.B. These demands are aggregated into a single core demand in 705, with a total bandwidth of 30. That is, the sum of the bandwidths of these three demands.

The fifth demand in 700 has destination node equal distance (distance=10) from four core routers, {CR1.A, CR2.A, CR1.C, CR2.C}. These are therefore the destination nodes in the corresponding demand in 705.

Figure 9:
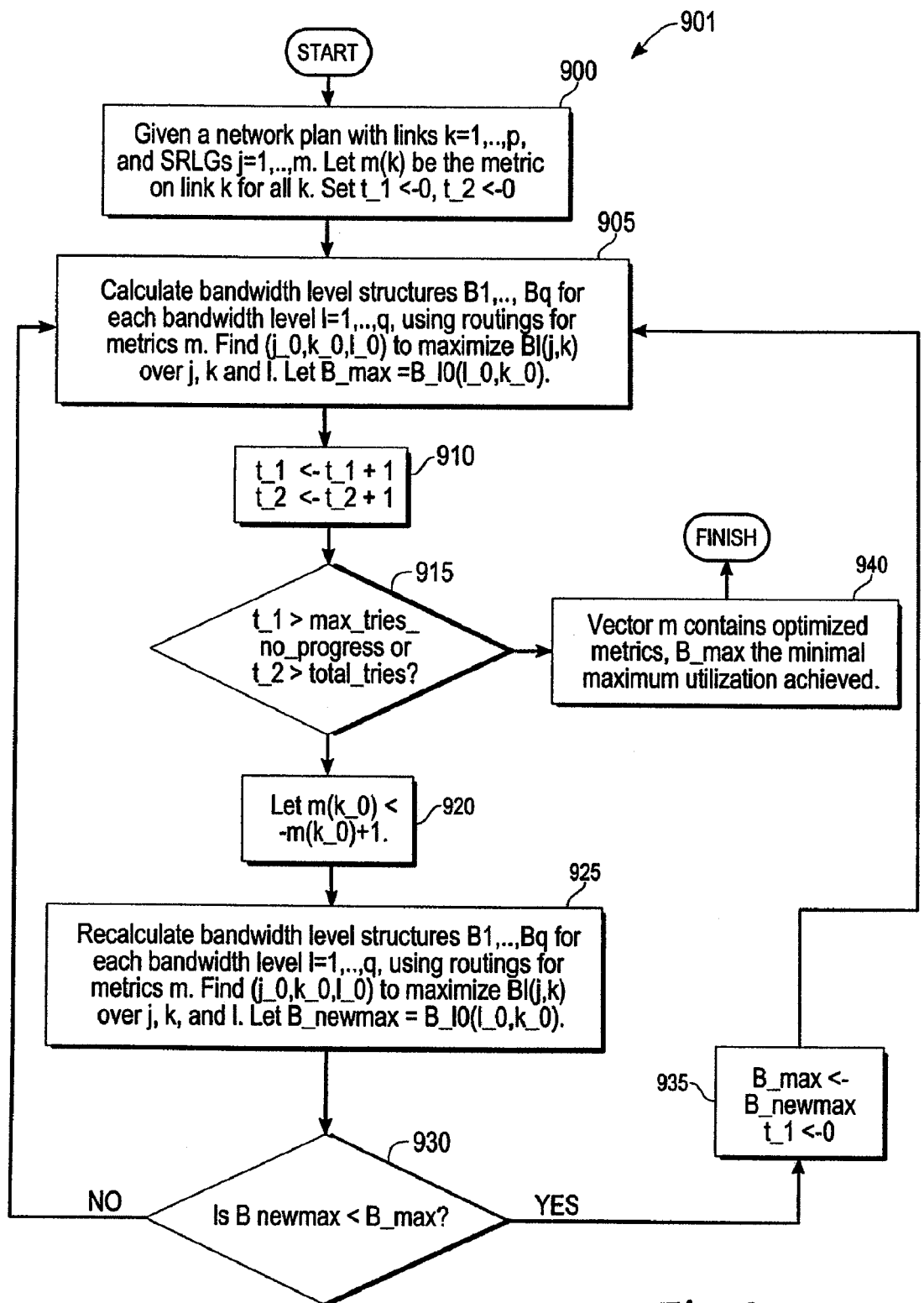
FIG. 9 is a flowchart illustrating a method, according to an exemplary embodiment of the present invention, to optimize metrics in a metric optimization module.

FIG. 9 is a flowchart illustrating a method 901, according to one exemplary embodiment of present invention, to optimize metrics in the metric optimization module 520.

The particular optimization objective of the exemplary method 901 is to minimize the maximum link utilization, where the maximum utilization is taken over all links, over all SRLG failures, and over all bandwidth levels specified in the network plan structure 200. The higher a link utilization, the more likely the link is to experience congestion and therefore to lead to an interruption in the data transmissions across that link. By ensuring that the maximum link utilization over all links, SRLG failures, and bandwidth levels are as low as possible, the method 901 seeks to provide low utilization levels for all links in the subject network 601 under a variety of operational situations, including:

1. The "no-failure" SRLG operational mode in which all elements of the network 601 are functioning correctly,
2. Operation under any other SRLG failure listed in the network plan 500, including (if included in the list) circuit failures, node failures, and other SRLG failures such as conduit failures.
3. Operation under different bandwidth levels, which may represent bandwidths at different times of the day or week.
4. Operation under different bandwidth levels, which may represent different hypotheses about what the real bandwidth levels for each demand in the network are. These hypotheses may be, for example, created by the demand estimation module (110).

Note that, if only a subset of the nodes in network plan 500 are defined as core nodes, then this optimization will only occur over the core links between these core nodes. This means that utilizations in non-core links will not attempt to be minimized. Besides the computational advantage of restricting the optimization to the core, this restriction has the further advantage of ignoring congestion in small access links into the network 601, where congestion may be unavoidable, perhaps because only one access link is available to bring certain bandwidth demands into the core network.

In the first block 900, the network plan 500 is defined to be indexed with p links k=1, . . . , p, and m SRLGs defined, j=1, . . . , m. For each k, m(k) is defined to be the current metric on link k. Two counters, t_1 and t_2, are set to 0.

In block 905, bandwidth level structures are calculated for each of the q bandwidth levels, l=1, . . . , q, in the network plan 500, using routings calculated from the metrics m. These bandwidth level structures may be calculated, for example, using the method 401 described above with reference to FIG. 4. The triple j_0,k_0,l_0) is found so that the utilization in SRLG j_0, in link k_0, in bandwidth level 1, is the highest over all utilizations in all links and SRLGs in all bandwidth levels in the network plan. B_max is set to be this maximum bandwidth level.

In block 910, the two counters t_1 and t_2 are incremented by 1.

In decision block 915, the counters are tested. In the exemplary embodiment, a limit is set on the maximum number of iterations in the method 901 may perform without any progress in lowering the objective, max_tries_no_progress. If t_1 exceeds this limit, the optimization loop is terminated. There is also a limit set on the maximum number of iterations in this algorithm, with or without progress, total_tries. If t_2 exceeds this limit, the optimization loop is terminated.

If neither condition in decision block 915 is met, block 920 increments the metric of the link k_0, which was discovered to be the highest utilized in block 905. By raising this metric, there is a chance that some demands routed through link k_0 will now be routed elsewhere, as there is now a new shorter path through the network.

Block 925 performs the same calculations as block 905, finding the triple (j_0,k_0,l_0) yielding the highest utilization under the new metric settings. This highest utilization is stored in B_newmax.

Decision block 930 checks whether the new utilization B_newmax is less than the previous maximum utilization B_max. If so, progress has been made in lowering the maximum utilization. In this case, block 935 resets the counter t_1 to 0, and sets B_max to the new maximum, B_newmax, and flow resumes at block 905. If not, flow resumes at block 905 directly.

After either of the tests in decision block 915 have been met, the method 901 terminates. The vector m contains the new, optimized metrics, and B_max the new minimal maximum utilization that has been achieved.

Figure 10:
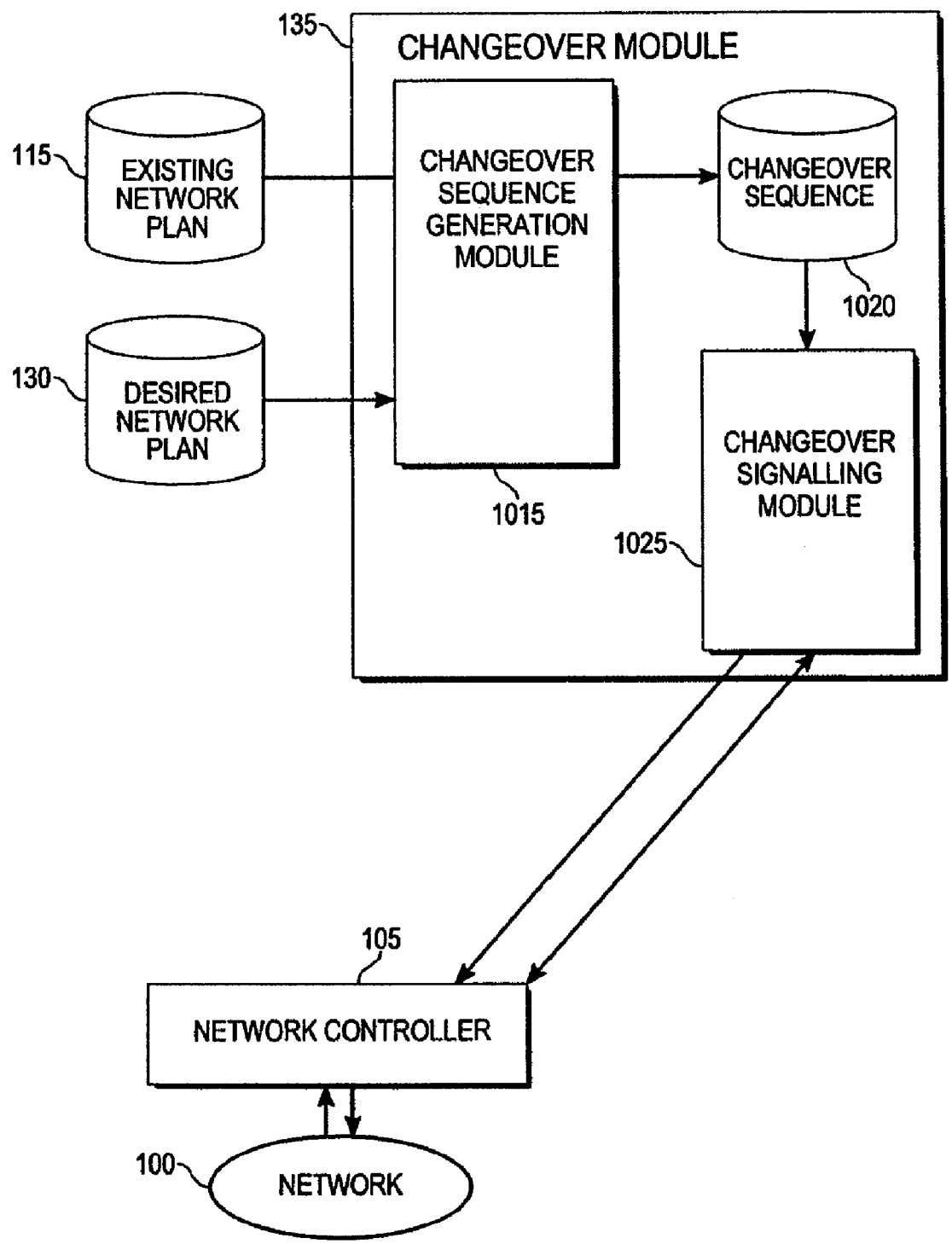
FIG. 10 is a block diagram illustrating the architecture of a changeover module, according to an exemplary embodiment of the present invention.

FIG. 10 is a block diagram illustrating the changeover module 135, according to the exemplary embodiment of the present invention. Data flow between submodules of the changeover module 135 is shown.

FIG. 10 illustrates two inputs to the changeover module 135, namely:
1. The existing network plan 115, which, it will be recalled, is a network plan structure (as depicted in FIG. 2) representing the current state of a subject network.
2. The desired network plan 130, which is a network plan structure representing the desired new state of the subject network. These two plans have the same topology structures 205, except for (possibly) different metrics on each link in the topology. They have identical demand structures 220, and identical SRLG structures 230, except that some SRLGs active in the one plan may be inactive in the other, and vice-versa.

The changeover module 135 may perform two tasks. The one, performed by a changeover sequence generation module 1015, is to generate a changeover sequence 1020 of step-by-step changes to migrate the subject network from the state reflected in the existing network plan 115 to the state reflected in the desired network plan 130. Each step in the changeover sequence 1020 may be, for example, the activation of an SRLG, the deactivation of an SRLG, or the changing of the metric of a single link.

The changeover sequence 1020 is then executed on the subject network by a changeover signaling module 1025. The changeover signaling module 1025 sends signals to a network controller 1030, instructing the controller 1030 which changes should be made to a subject network 1035. After each change in the changeover sequence 1020 has been made successfully, the network controller 1030 replies to the changeover signaling module 1025 that the change was made successfully, and the changeover signaling module 1025 sends the next change in the changeover sequence 1020 to the network controller 1030.

Figure 11:
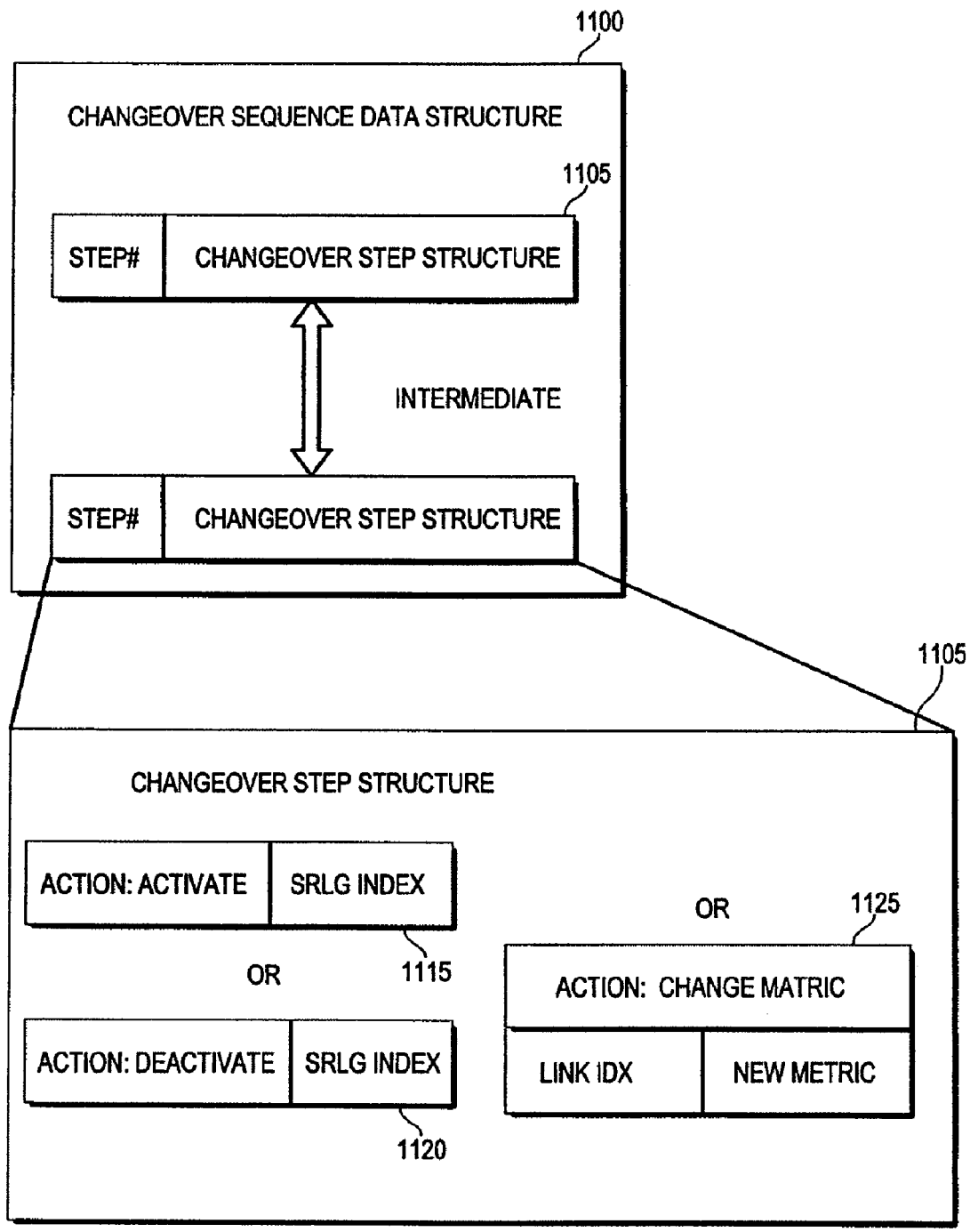
FIG. 11 is a block diagram illustrating a data structure of a changeover sequence, according to an exemplary embodiment of the present invention, which may be created by a changeover sequence generation module.

FIG. 11 is a block diagram illustrating a data structure 1100 of the changeover sequence 1020, according to an exemplary embodiment of the present invention, which may be created by the changeover sequence generation module 1015.

The changeover sequence data structure 1100 contains a list of changeover step structures 1105, numbered from 1 to the total number of steps in the changeover sequence 1020. Each changeover step structure 1105 consists of one of three possible substructures, denoted 1115, 1120 or 1125.

Specifically, a changeover step structure 1105 contains a structure 1115 if the step represented by the changeover step structure 1105 is the activation of an SRLG in the network plan. The structure 1115 contains a command to activate, together with the index of the SRLG, which is currently inactive, and which must be activated in this step of the changeover sequence.

A changeover step structure 1105 may contain a structure 1120, if the step represented by the changeover step structure 1105 is the deactivation of an SRLG in the network plan. The structure 1120 contains the command to deactivate, together with the index of the SRLG, which is currently active, and which must be deactivated in this step of the changeover sequence.

A changeover step structure may similarly contain a structure 1125, if the step represented by the changeover step structure 1105 is the changing of a metric of a link in the network plan. The structure 1125 contains the command to change a metric, together with the index of the link whose metric must be changed, and the new metric to which the metric of that link must be changed.

Figure 12:
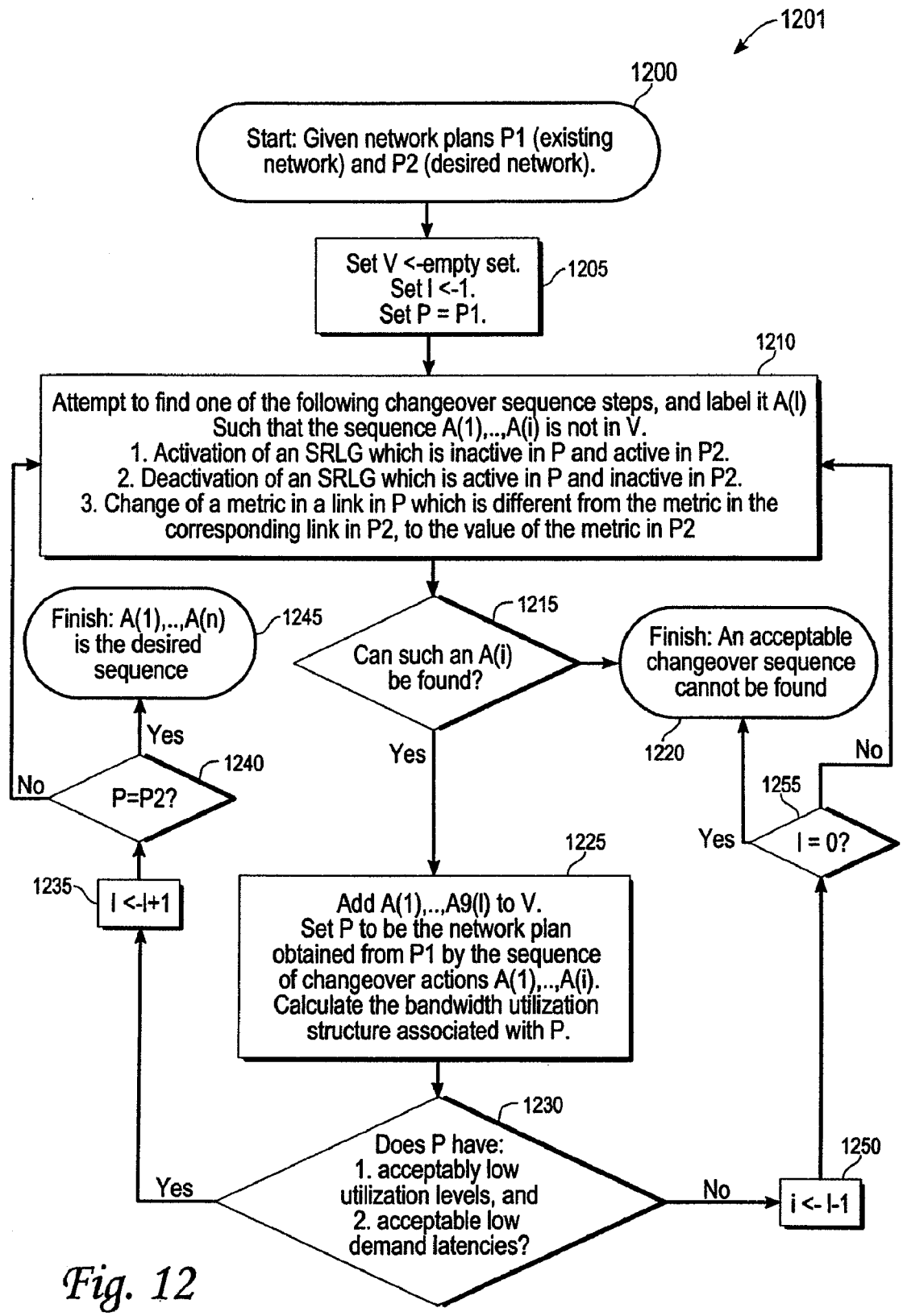
FIG. 12 is a flowchart illustrating a method, according to an exemplary embodiment of present invention, which may be implemented by a changeover sequence generation module to generate a changeover sequence.

FIG. 12 is a flowchart illustrating a method 1201, according to an exemplary embodiment of the present invention, that may be used by the changeover sequence generation module 1015 to generate a changeover sequence 1020.

It may be useful to find an appropriate order in which the changes should be made in the network for the following reasons:

The changes cannot necessarily all be made at once. A shortest-path routed network needs time to rediscover the shortest-path routings through a subject network each time a metric change is made, or elements of the subject network are activated or deactivated. During this time, the subject network may be disrupted, where some parts of the subject network have updated to the new routings and others have not. A small change, such as a single metric change or a single element activation or deactivation, will result in a faster convergence to a new set of routings in the network, without as much disruption as a large number of simultaneous changes.

Given that a number of small changes must then be made sequentially, it is desirable that the intermediate routings (e.g., those that occur when part, but not all, of the steps of the changeover sequence 1020 have been completed), should be acceptable. For example, they should not lead to excessively high utilizations under normal operation of the subject network, under the bandwidth level currently being used by the demands through the subject network. Other considerations may also be important. For example, it may be necessary that the utilizations in these intermediate stages under failure of an SRLG are not too high, so that if this failure occurs in the middle of executing a changeover sequence, the subject network does not become congested. Also, it may be necessary to ensure that the latencies of the routings in the network are not too high in any of the intermediate steps, so that a certain quality of service is met for all users of the subject network.

In start block 1200, the existing and desired network plans 115 and 130 are received by the changeover sequence generation module 1015. These plans 115 and 130 are denoted into the flowchart of FIG. 12 as P1 (existing network) and P2 (desired network).

In block 1205, the set V, which will contain all possible partial changeover sequences that have been examined for acceptability, is set to the empty set. The counter i is set to 1, and the current intermediate network plan P is set to the existing network plan, P1.

In block 1210, an appropriate changeover step is sought which, when applied to the current intermediate network plan P, will move the network plan one step closer to the desired network plan P2, and will provide an acceptable intermediate network plan. The changeover step sought, A(i), should be such that the partial changeover sequence A(1), ..., A(i) is not in V. This ensures that a potential changeover sequence is not examined that has already been examined. A(i) should be one of the following changeover steps:

1. The activation of an SRLG that is inactive in P but active in P2,

2. The deactivation of an SRLG that is active in P but inactive in P,

3. The changing of a metric of a link from its value in P to a (different) value in P2.

In block 1215, flow diverges depending on whether or not such an A(i) can be found. If not, an acceptable changeover sequence cannot be found, and the method 1201 finishes at block 1220.

If such an A(i) can be found, then the partial changeover sequence A(1), ..., A(i) is added to V, and the current intermediate network plan P is updated with the change specified in A(i). The bandwidth utilization structure for the current intermediate network plan P is calculated, using for example the method 401 described above with reference to FIG. 4.

In block 1230, the bandwidth utilization structure of the current intermediate network plan P is checked to determine if the bandwidth utilizations are acceptable. Also, the latencies of the demands routed in P are checked to determine whether they are acceptable. If the current intermediate network plan P is acceptable, block 1235 advances the counter i. Block 1240 checks if the current intermediate network plan P is equal to the desired network plan P2, in which case A(1), ..., A(i) is a complete changeover sequence 1020 from P1 to P2, and the method 1201 terminates at 1245. If not, the method 1201 returns to 1210, and the next A(i) is found.

If, at block 1230, the current intermediate network plan P is not found to have appropriate utilization levels and/or routing latencies, the method 1201 backtracks. At block 1250, i is reduced by 1. If at decision block 1255 i is determined to be equal to 0, then no appropriate sequence can be found, and the method 1201 finishes unsuccessfully at end block 1220. If not, the method 1201 returns to block 1210 to attempt to find another A(i) that will be appropriate.

Figure 13:
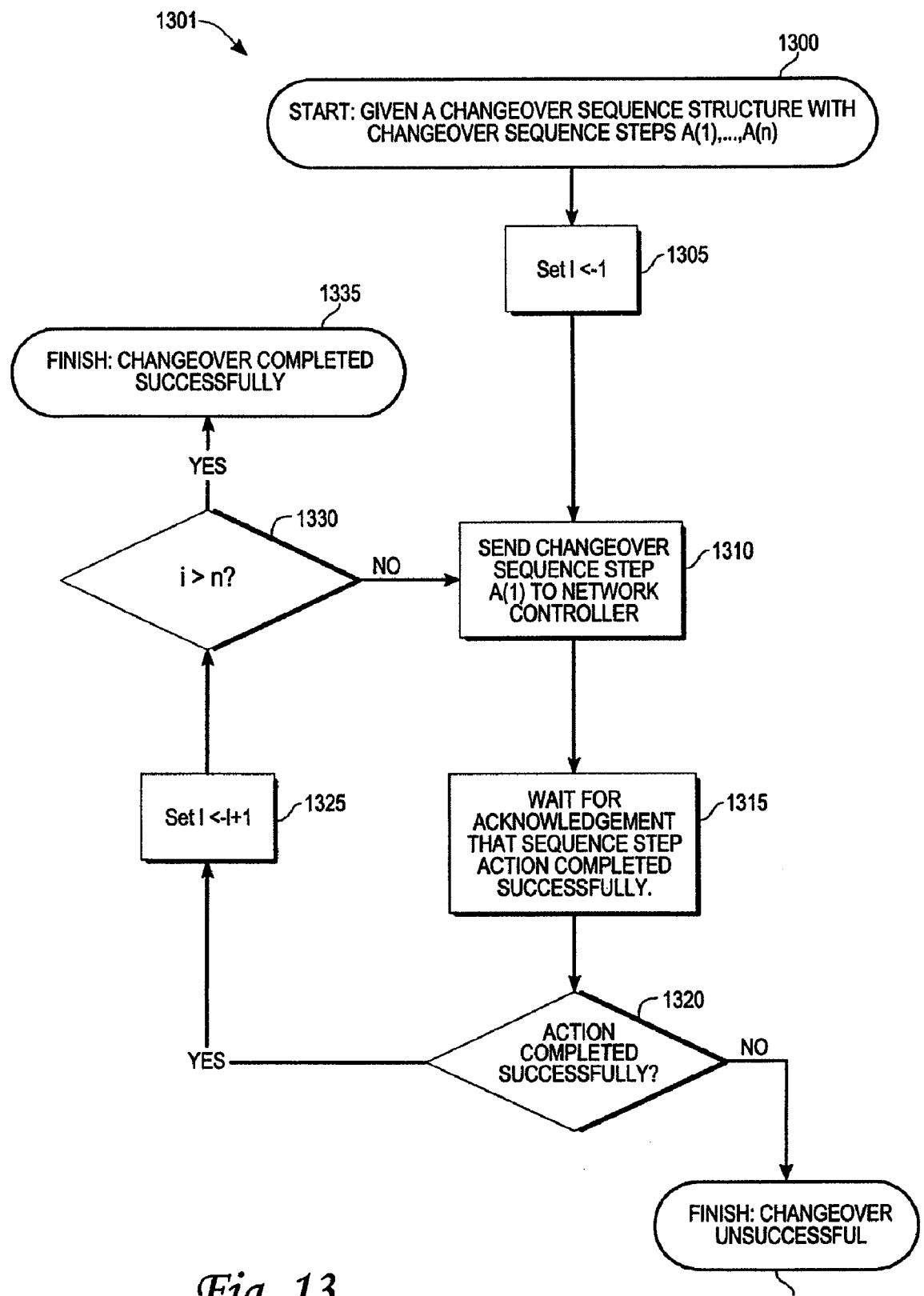
FIG. 13 is a flowchart illustrating a method, according to an exemplary embodiment of the present invention, that may be implemented by a changeover signaling module to execute a changeover sequence, utilizing a network controller.

FIG. 13 is a flowchart describing a method 1301, according to an exemplary embodiment of the present invention, that may be used by the changeover signaling module 1025 to execute the changeover sequence 1020, utilizing the network controller 1030.

At the start block 1300, the changeover signaling module 1025 receives the changeover sequence 1020. Label the n steps in this sequence A(1), ..., A(n).

In block 1305, the counter i is initialized to 1.

In block 1310, the changeover sequence data structure 1100, associated with the changeover sequence 1020, of changeover sequence step A(i) is sent to the network controller 1030 for implementation on the subject network 1035.

In block 1315, the method 1301 waits until an acknowledgement is received from the network controller 1030 that the changeover sequence step has been successfully executed, and that the network 1035 has reconfigured itself completely to rerouting data according to the new metrics or element activities signaled by the changeover sequence step.

In block 1320, the acknowledgement from the changeover signaling module 1025 is checked. If the action was completed successfully, then the counter i is incremented in 1325. In block 1330, if i is greater than n, the changeover has been successfully completed, and the method 1301 finishes at 1335. If at 1325 i is not greater than n, the method 1301 returns to 1310 to send the next step to the network controller 1030.

If at block 1320 an action is determined not to have completed successfully, the changeover was unsuccessful, and the method 1301 finishes at block 1340.

FIG. 14 is a diagrammatic representation of a changeover sequence structure 1405, and a table 1400 of utilizations of links in the network 1035 under each step in the changeover sequence 1020.

For the example provided in FIG. 14, the existing network plan 115, which yielded the changeover sequence 1020, is the network plan structure 200 in FIG. 2. The desired network plan 130 is identical to the existing network plan 115, except that 1. SRLG "Circuit 2" is deactivated, 2. Two links, 3.1 and 4.1, have had metrics changed from 10 to 5.

Under the existing network plan 115, under the "No Failure" failure scenario, as is shown both in the bandwidth level utilization structure 240, in the row labeled "No Failure" and also in the row of the table of utilizations labeled 1400 in FIG. 14 under Step 0 of the changeover, only two links are utilized: link 1.1 and link 2.1, which are both utilized at 75%. This is because the single demand in the network plan, from Node A to Node B, is routed with half its bandwidth (750 Mb/s) along link 1.1, which is one of the shortest paths from A to B, and the other half of its bandwidth along link 2.1, which is the other shortest path from A to B.

Under Step 1 of the changeover sequence structure 1405, the metric of link 3.1 is changed from 10 to 5. The shortest routings from A to B are unaffected by this change, and as is shown in Step 1 of Table 1400, the utilizations remain the same.

Under Step 2 of the changeover sequence structure 1405, the metric of link 4.1 is changed from 10 to 5. After this change there are now three shortest routings from A to B: the two previous routings, and a path through links 3.1 and 4.1, also with a total route length of 10. As is shown in Step 2 of table 1400, link utilizations reflect that the demand from A to B is now satisfied by 500 Mb/s being transmitted along each of these three routes, leading to a utilization of 50% in each of links 1.1, 2.1, 3.1 and 4.1.

Finally, in Step 3 of the changeover sequence structure 1405, the SRLG labeled "Circuit 2" is deactivated. Now there are only two shortest routes from A to B. One is through Link 1.1, and the other through links 3.1 and 4.1. It is no longer possible to route traffic through the deactivated link 2.1, since it is part of Circuit 2. Link utilizations are therefore as shown in row 3 of the table 1400.

Note that the order in which the three changeover steps of the changeover sequence structure 1405 are performed may be important. If, for example, the deactivation step had been performed first, there would have then only been a single shortest route from A to B, through link 1.1. This link utilization would have been 150%=1500/1000, which would have lead to severe congestion in the network.

Figure 15:
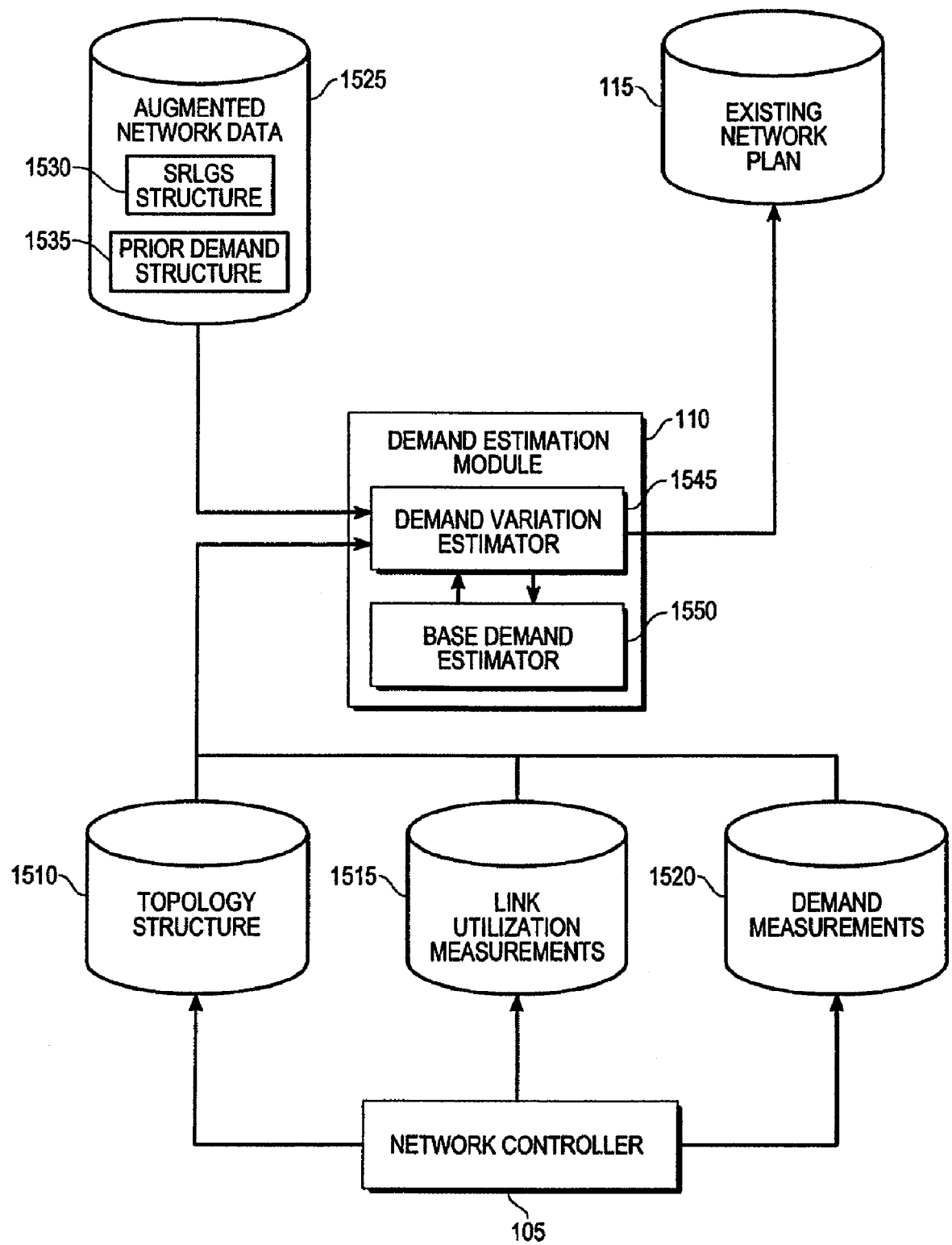
FIG. 15 is a block diagram illustrating an interaction, according to an exemplary embodiment of the present invention, of a demand estimation module with other elements of the traffic engineering system

FIG. 15 is a block diagram showing the interaction, according to an exemplary embodiment of the present invention, of the demand estimation module 110, previously discussed above with reference to FIG. 1, with the rest of the system 10. The demand estimation module 110 is depicted as block 1500 in FIG. 15.

The demand estimation module 110 constructs a network plan structure 200, which is a representation of the current state of the network 100, and stores this structure as the "existing network plan" 115. The various components of the network plan structure 200 are taken from different sources and integrated together by the demand estimation module 110.

A topology structure 1510 is provided by the network controller 105, since the information in the topology structure 1510 is typically available to be read from network configurations. The Shared Risk Link Groups Structure is provided by augmented network data 1525. The augmented network data 1525 is usually constructed using external knowledge of the network 100, and is not available to the network controller 105 itself. For example, whether or not two circuits lie in the same conduit and would therefore together form an SRLG is not information that the network controller 105 can necessarily detect by reading network configurations.

The demand structure 220 in the network plan structure 200 is constructed by the demand estimation module 110 using three separate inputs, namely:
1. Link utilization measurements 1515 (e.g., expressed as a percentage of link capacity); and
2. Demand measurements 1520 (e.g., expressed in Mb/s), obtained through the network controller 105; and
3. A prior demand structure 1535, which is part of the augmented network data 1525. The prior demand structure 1535 is a data structure of the form of the demand structure 220, illustrated in FIG. 2, and contains a single bandwidth level 225. The prior demand structure 1535 lists all the demand sources and destinations that exist in the network 100. The corresponding bandwidth level for each of these demands is a prior estimate of the demand bandwidth level. This estimate may be obtained either by historical measurements of demand levels, or using some external estimation procedure based on utilization measurements of the network, or some other estimation method.

The demand measurements 1520 are a list of a subset of the demands in the prior demand structure 1535, together with measurements of these demand bandwidth levels made directly from the network 100. If this list of demand measurements 1520 includes all the demands in the prior demand structure 1535, then all demand bandwidth levels are known, and the demand estimation module 110 becomes superfluous. If none or only some of the demands in the prior demand structure are contained in the list of demand measurements 1520, then the role of the demand estimation module 110 is to provide estimates for those links for which no measurements have been made, using the link utilization measurements 1515, the known demand measurements, and the prior demands.

The demand estimation module 110 either produces a demand structure 220 either with a single bandwidth level (e.g., expressed in Mb/s), representing the best estimate of the demand bandwidths, or multiple bandwidth levels, each with a different estimate of demand bandwidths. These multiple bandwidth levels together express the variation in the demand bandwidth estimates. Each represents a different bandwidth level scenario, so that the GUI 140 and other components of the system 10 may assess the effect of topology and metric changes under different bandwidth level scenarios, or perform metric traffic engineering to cater for the worst-case bandwidth level scenario.

Figure 16:
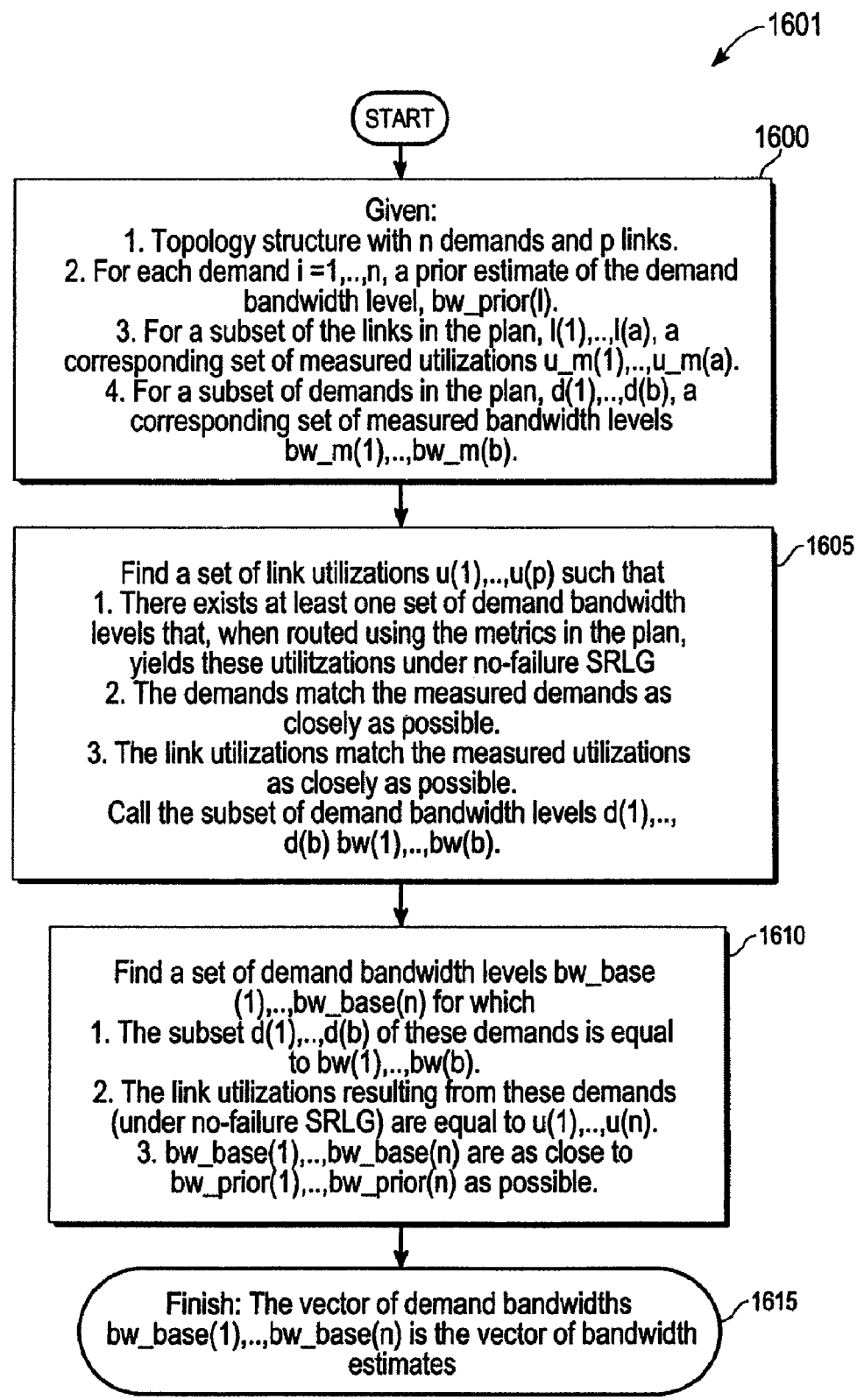
FIG. 16 is a flowchart of illustrating a method, according to an exemplary embodiment of the present invention, which may be implemented by a basic demand estimator to calculate a basic demand
Figure 17:
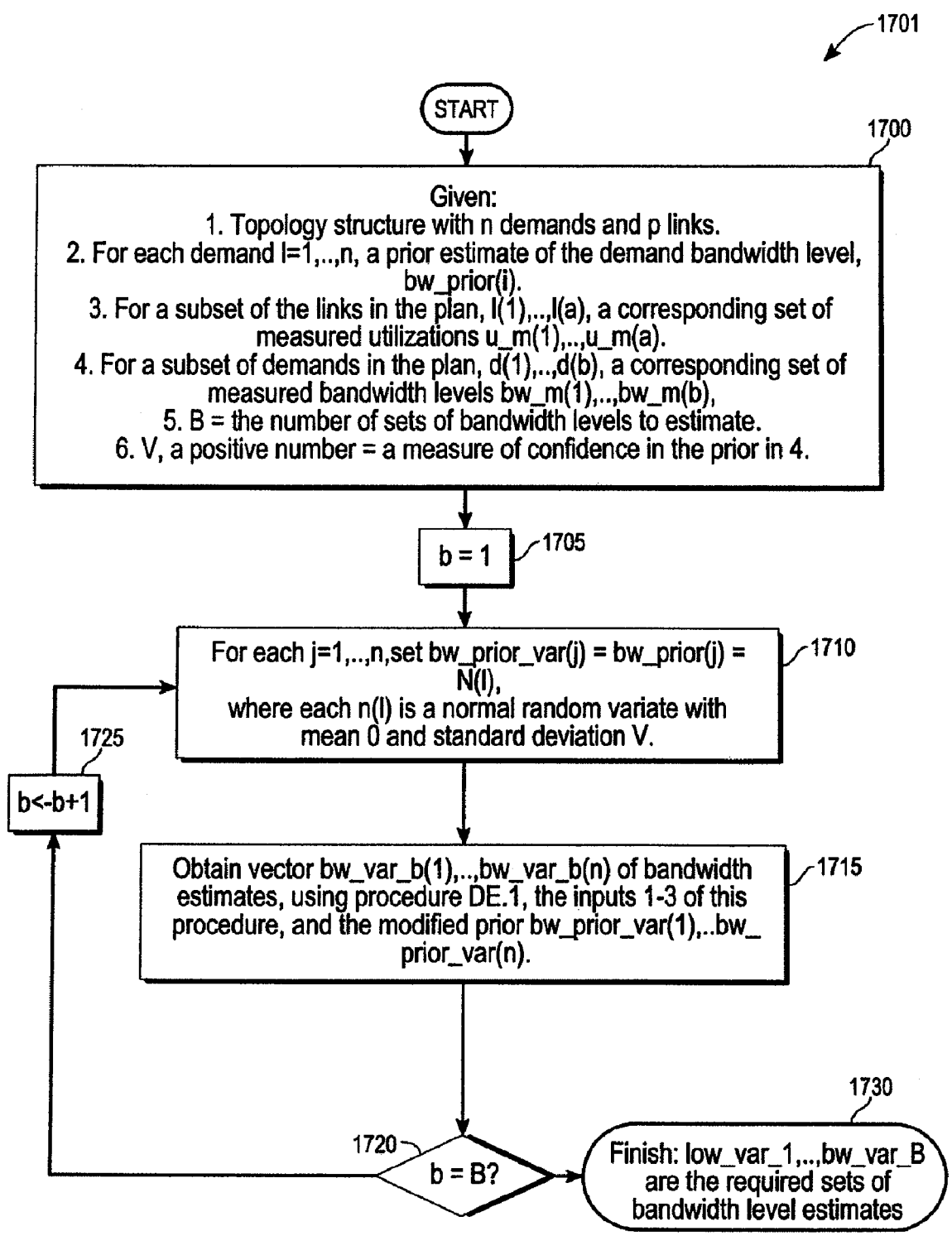
FIG. 17 is a flowchart illustrating a method, according to an exemplary embodiment of the present invention, which may be implemented by a demand variation estimator to calculate demand variations

The demand estimation module 110, in the exemplary embodiment, is shown to include submodules. The first submodule is a base demand estimator 1550, which operates to produce a single demand bandwidth level estimate, given a prior demand structure, link utilization measurements and demand measurements. FIG. 16 is a flowchart depicting an algorithmic method 1601 that may be implemented by the base demand estimator 1550. The second submodule is a demand variation estimator 1545, which operates to construct variations on the bandwidth levels in the prior demand structure 1535, and then to call the base demand estimator 1550 with these variations, so that the base demand estimator 1550 returns to it variations in the bandwidth level estimates. From these variations, the demand variation estimator 1545 constructs a set of bandwidth levels 225 for the demand structure 220 that will be inserted into the existing network plan 115. FIG. 17 is a flowchart illustrating an algorithmic method 1701, according to an exemplary embodiment of the present invention, that may be implemented by the demand variation estimator 1545.

As noted above, FIG. 16 is a flowchart illustrating an algorithmic method 1601, that may be implemented by the base demand estimator 1550 to estimate bandwidth levels for a demand structure.

In block 1600, the notation of the input data is shown. A topology structure is specified with p links. A demand structure is specified with n demands, and corresponding bandwidth levels bw_prior(1), . . . , bw_prior(n), representing prior bandwidth levels for each of the n demands. Link utilization measurements are represented by a subset of links l(1), . . . , l(a), for a<=p, together with a corresponding set of link utilization measurements u_m(1), . . . , u_m(a). Demand measurements are represented by a subset of demands d(1), . . . , d(b), for b<=n, together with a corresponding set of measured bandwidth levels bw_m(1), . . . , bw_m(b).

Measurements of demand bandwidths and link utilizations may not be completely consistent with one another, either because of faulty measurement systems, or because different measurements are taken at slightly different times. The first step in estimation, performed in block 1605, is therefore to find a set of a completely consistent set of link and demand measurements that is as close to the given measurements as possible. Specifically, block 1605 finds link utilizations for each link, called u(1), . . . , u(p), such that:
1. There exists at least one set of demand bandwidth levels that, routed through the network 100 using the given topology and metric settings, will yield the utilizations u(1), . . . , u(p), assuming that there are no failures in the network 100, and that the network 100 is therefore running under the "no-failure" SRLG.
2. The bandwidth levels of the subset d(1), . . . , d(b) of these demands matches the measured demand bandwidth levels bw_m(1), . . . , bw_m(b) as closely as possible.
3. The link utilizations of the subset l(1), . . . , l(a) of these link utilizations matches the measured link utilizations u_m(1), . . . , u_m(a) as closely as possible.

One way of finding such a set of utilizations is to solve a linear program, specified as follows. Let A be the n×p routing matrix for the network, i.e., given a p-vector of utilizations u, and a n-vector of demand bandwidth levels bw, $$A \times bw = u.$$

Then the linear program minimizes $$s\_1 \sum_{i=1}^{a} |u(i) - u\_m(l(i))| + s\_2 \sum_{i=1}^{b} |bw(i) - bw\_m(d(i))|$$

subject to A×bw=u. The relative size of the positive real numbers s_1 and s_2 determines the relative importance of matching given link utilization measurements to the resulting vector u versus matching given demand measurements to the underlying demands bw generating u. These will be varied depending, for example, on the relative degree of confidence one has in each of these two sets of measurements.

Once the vector u has been calculated, block 1610 performs the actual demand estimation. Specifically, the base demand estimator 1450 seeks to find a set of demand bandwidth levels that both match the data closely (e.g., measured link utilizations and demand bandwidth levels), and which are close to the specified prior bandwidth levels bw_prior. Thus, the base demand estimator 1550 seeks the set of estimated bandwidth levels bw_base(1), ..., bw_base(n) that satisfies:

1. The subset d(1), ..., d(b) of these demands is equal to bw(1), ..., bw(b),
2. The link utilizations resulting from these demands (i.e. the vector A×bw_base) are equal to u(1), ..., u(n),
3. The bandwidth levels bw_base(1), ..., bw_base(n) are as close to bw_prior(1), ..., bw_prior(n) as possible Noted that because u satisfies the requirements in block 1605, there will exist at least one vector bw_base that satisfies 1 and 2. One way of finding such a vector is to rewrite the above three requirements formally as 1. $bw\_base(d(i)) = bw(i)$, for $i = 1, \ldots, n$,
2. $A \times bw\_base = u$,
3. minimize $\sum_{i=1}^{n} (bw\_base(i) - bw\_prior(i))^2$ and solve for bw_base using a quadratic program.

Block 1615 finishes the method 1601. The required bandwidth estimates are bw_base(1), ..., bw_base(n).

FIG. 17 is a flowchart illustrating an algorithmic method 1701, according to an exemplary embodiment of the present invention, that may be implemented by demand variation estimator 1545, illustrated in FIG. 15, to estimate a range of bandwidth levels for the demand structure 220 of a network plan structure 200, all feasible estimates of demand bandwidth levels given the available measurements of utilizations and demand bandwidths available from the network through the network controller 105.

Block 1700 shows the inputs to the method 1701. These are the same as the inputs to the method 1601 in FIG. 16, with two additions. One, B, is the number of sets of bandwidth levels to estimate. The other, V, is a positive number that is a measure of the confidence in the prior, bw_prior, specified. A value of V=0 shows complete confidence in the bandwidth prior, and in this case all of the bandwidth level sets, 1, ..., B, will be equal to the bandwidth prior itself. The larger V is, the less confidence there is expressed in the bandwidth prior and the wider the range of sets of bandwidth levels will be generated by the method 1701 (constrained, however, by the utilization and bandwidth demand estimates.)

In block 1705, b, the counter from 1 to B, is set to 1.

In block 1710, a new bandwidth prior vector, bw_prior_var, is constructed. Each value bw_prior_var(i) of this vector, with i=1, ..., n, is set to bw_prior(i)+N(i). Here, each N(i) is a random variable generated from a normal distribution with mean 0 and variance V. Other distributions besides these normals could be used here to generate variability in the bandwidth prior.

In block 1715, the method 1601 illustrated in FIG. 16 is called with all the inputs 1-4 specified in block 1700, but with the prior bandwidth vector bw_prior replaced by bw_prior_var. This procedure produces an estimate of the bandwidth levels, the vector bw_var_b.

In blocks 1720 and 1725, checks are performed that the iteration has completed, and the counter b is incremented if the iteration is not complete. Once the iteration is complete, flow passes to block 1730, and the method 1701 finishes. The vectors bw_var_1, ..., bw_var_B are the B bandwidth levels estimated by the procedure.

As described above, the GUI 140 provides a visual representation of an existing network plan 115 to a user, so as to facilitate user understanding of a current state of a network. FIGS. 18-21, described below, show exemplary interfaces that may be generated and presented by the GUI 140, in one exemplary embodiment if the present invention.

Figure 18:
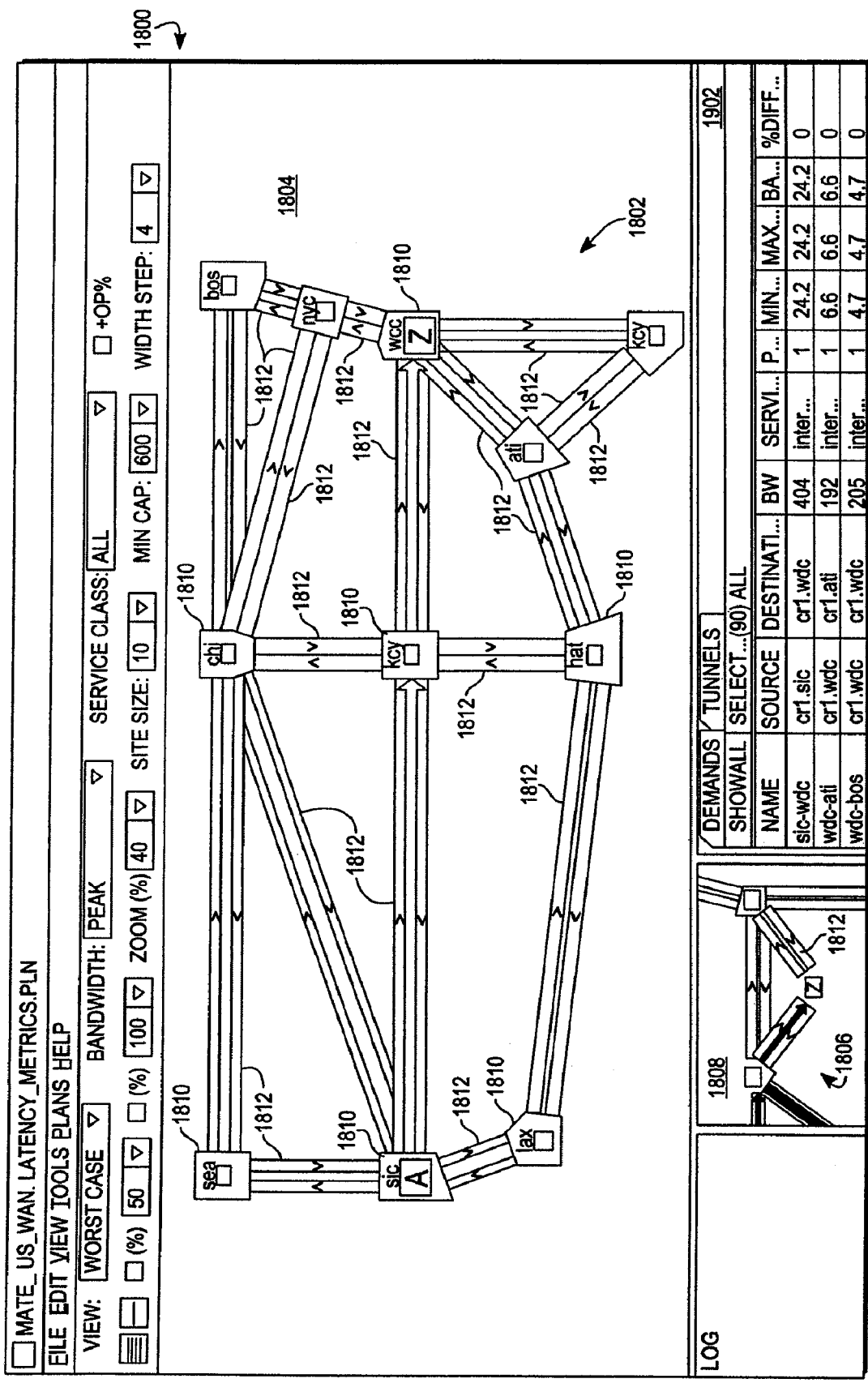

Turning first to FIG. 18, an interface 1800 provides an extrasite view 1802 of a subject network in a major window 1804, and an intrasite view 1806 of a portion of the subject network in a minor window 1808. The extrasite view 1802 depicts the positions of network sites, each site potentially comprising a collection of nodes that may be at a common physical location. Circuits (e.g., two or more links) that connect two nodes in two different sites 1810 are shown in the extrasite view 1802 as connecting the relevant two sites 1810. The extrasite view 1802 further allows a user to select a particular site 1810 to be displayed within the minor window 1808 as an intrasite view 1806. Specifically, the intrasite view 1806 presents, for a selected site, the node included within that site and the circuit connections between the nodes at that site. The intrasite view 1806 further illustrates the circuits, which are connected to nodes within the selected site, as leaving the minor window 1808 in the direction of a node at another site to which the relevant node is connected. By providing the described two-level hierarchy of views, the interface 1800 provides an easily understood overview of a complex network topology, areas of high utilization, or extrasite routings.

It will also be noted from FIG. 18 that each of the exemplary circuits within the subject network is bi-directional, and contains two links, each link carrying network traffic in a particular direction. In one embodiment, the capacity of the circuit is the combined capacity of these links. Both the extrasite view 1802 and the intrasite view 1806 depict circuits as rectangles connecting to nodes or sites. Each of these rectangles is depicted with a width that is proportional to, or with a physical dimension that is otherwise related to, the capacity of the relevant circuit. For example, the higher the capacity of the circuit, the wider the relevant rectangle. Each of the rectangles representing the circuits is furthermore shown to be divided in the middle, to form two thinner rectangles, each of the thinner rectangles representing a respective link within the circuit. An arrow is associated with each of these thinner rectangles to show the direction that network traffic travels along a link represented by the respective thinner triangle.

In one exemplary embodiment, each of the thinner triangles representing a link, or each of the composite rectangle representing a circuit, maybe colored (or otherwise visually distinguished) to provide a visual representation of the percentage utilization of the relevant link or circuit. For example, the color associated with a rectangle may vary depending on the level of utilization to provide a clear visual signal of unacceptably high utilization. Utilizations may be depicted, for example, in green, orange or red, depending on whether the utilization is low (e.g., less than 50%), medium, or high (e.g., greater than 100%). A rectangle may also be made visually indicative of the bandwidth utilization by coloring a section of the graphical link in proportion to the bandwidth utilization (e.g., where 50% of the rectangle is colored, this indicates a 50% bandwidth utilization).

The boxes representing each of these sites 1810 may furthermore be colored, or otherwise visually distinguished, to identify a maximum utilization of any intrasite link within the relevant site 1810. For example, if one of the links within a particular site 1810 has a utilization of greater than 100%, the block depicting the site 1810 may be at least partially colored red. In this way, a user is provide with a convenient visual cue to identify problem sites when viewing the extrasite view 1802.

Figure 19:
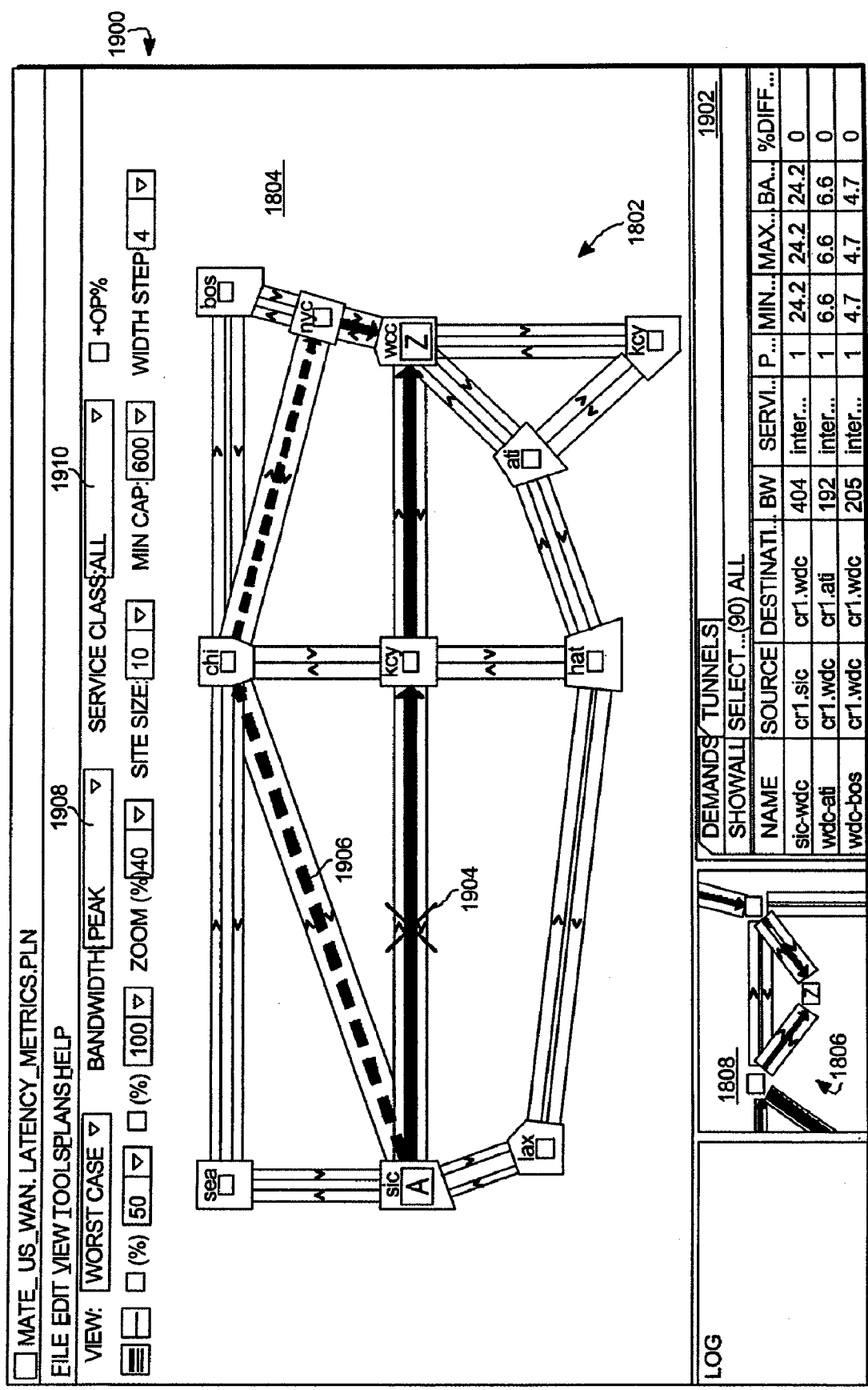

Interfaces presented by the GUI 140 may also be useful for visually depicting the routing of demand through a subject network under one or more failure scenarios. To this end, FIG. 19 illustrates an exemplary interface 1900, where the routing of demand through a network is shown under a selected failure scenario. For example, within the extrasite view 1802 shown in the major window 1804, a user may select a particular circuit for failure. In the exemplary interface 1900 illustrated in FIG. 19, the circuit 1904 is selected as a failed circuit.

The interface 1900 is also shown to include a table window 1902 that provides a user-selectable listing of various bandwidth demands through the network (e.g., bandwidth demand between SJC and WDC). A user selection of any of the demands shown in the table window 1902 causes the actual route that the selected demand takes through the subject network to be shown within the extrasite view 1802.

Following user selection of a particular failure scenario (e.g., by selecting one or more circuits as failed circuits), the interface 1900 depicts the re-routing of a selected demand (e.g., selected from the various demands shown within the table window 1902), as well as the bandwidth utilization (e.g., a percentage utilization) under the failure scenario utilizing color (or other visual distinctions) to indicate such utilizations. Further, re-routing may also visually be depicted within both the extrasite and the intrasite views 1802 and 1806. For example, the re-routing of the selected demand is shown in FIG. 19 in a broken line. The utilization of any links or circuits that exceeds the maximum capacity of the relevant circular link may furthermore be shown in red.

The interface 1900 also provides, in an exemplary embodiment, for the viewing of routed demands under different bandwidth levels. To this end, a drop-down menu 1908 of different bandwidth levels is provided, and a user is able to select from these different bandwidth levels. The selected bandwidth level is then applied to the routing depicted within the extrasite and intrasite views 1802 and 1806 within the interface 1900.

Packets within a network (e.g., an IP network) can be tagged with different service classes, which determine the relative priorities of the packets. A network may give precedence to one class of packet over another, so that lower-priority packets may only utilize the proportion of bandwidth in a link that is not required to service higher-priority packets. Consider for example a 1000 Mb/s link is 50% full of packets from a lower-priority service class, and 50% full of packets from a higher-priority service class. From the lower-priority flow point of view, the bandwidth capacity of the link is being fully utilized. However, from the higher-priority flow point of view, 50% of the link's bandwidth capacity is still available, as the higher-priority flow is able to displace the lower-priority flow as needed.

In the situation where a network routes packets from more than one service class, the GUI 140, in one exemplary embodiment of the present invention, provides a facility to view the network from the perspective (or viewpoint) of a specific service class. In one embodiment, the user interface presented by the GUI 140 may allow a user to select a service class view from a pull-down menu. To this end, the exemplary interface 1900 shown in FIG. 19 includes a service class menu drop-down menu 1910, which presents a number of service classes that are user-selectable as a service class view. In the state illustrated in FIG. 19, the "ALL" service class has been selected. Once a service class is selected from the drop-down menu 1910, the size of the links (e.g., represented by the thinner rectangles) within the views presented in the interface 1900 may be changed to represent the capacity of the relevant link from the viewpoint of the selected service class (e.g., the full capacity of the link less the utilization of all higher-priority service classes). The utilizations displayed are accordingly the utilization of the links by packets from the selected service class, as a proportion of the utilization "seen". Consider for example where a network supports two service classes, as explained in the example above, each using 50% of a link's capacity. A particular link appears differently from each of the following three views:

1. "ALL" service class view: In this view, the width of the link represents 1000 Mb/s, and the link is shown to be fully utilized (e.g., to be colored red).
2. The "lower-priority" service class view: The width of the relevant link is less, representing 500 Mb/s, and the link is shown to be fully utilized (e.g., colored red).
3. The "higher-priority" service class view: The width of the link depicts that it has a capacity of 100 Mb/s, and 50% of the capacity of the link is shown to be utilized (e.g., the link is colored orange).

The concept of "failure scenarios" is discussed above. It will be appreciated that a failure scenario may involve the simultaneous failure of a set of links (e.g., two links in a circuit could form a failure scenario, since if the circuit fails both of the links within the relevant circuit will fail too). Interfaces presented by the GUI 140 simulations and optimizations consider the behavior of a subject network over a list of specified failure scenarios, as described above.

Figure 20:
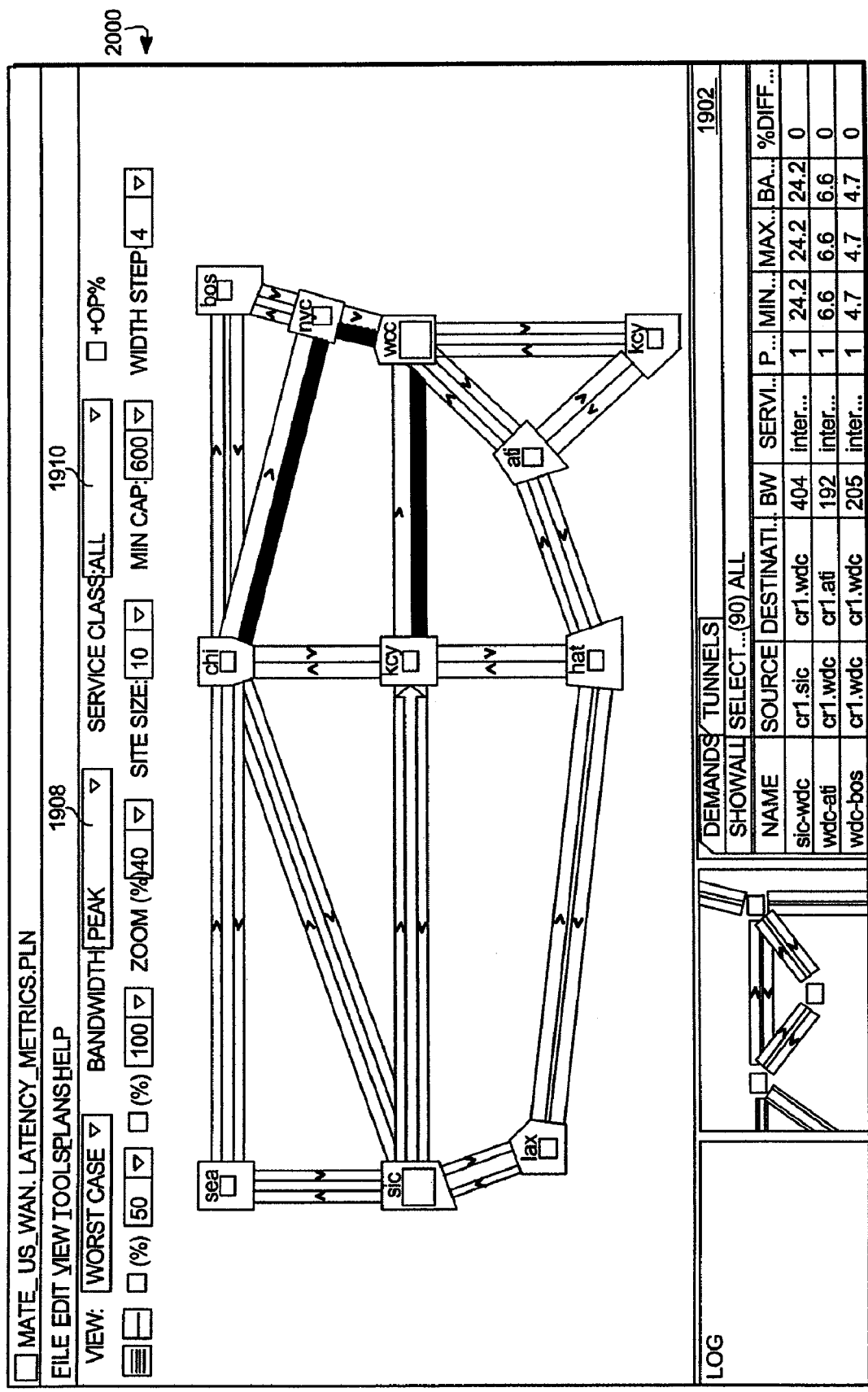

For any particular link in a subject network, a quantity of interest is the maximum utilization of a particular link over multiple different failure scenarios. If the maximum utilization of a particular link exceeds a predetermined capacity (e.g., utilization is over 100% of the link capacity), this means that there are one or more failure scenarios that, were they to occur, would cause re-routing of the network that would cause congestion in the relevant link. To this end, the GUI 140 may present a "worst-case" display mode that shows, simultaneously, the utilizations of different links under a particular failure scenario that caused the particular link to achieve its maximum utilization. FIG. 20 illustrates an exemplary interface 2000 that visually identifies links 2002 that congest under one or more failure scenarios. The interface 2000 further allows a user to review the scenario, or scenarios, that resulted in the congestion of the links. For example, by user selection of one of the congested links, the one or more failure scenarios that result in the congestion of the selected link may be displayed by the interface 2000 (e.g., in a manner similar to the depiction of the failure scenario in the interface 1900 shown in FIG. 19).

Finally, the GUI 140 may also present the information that has been described above, with reference to FIGS. 18-20 as being shown in graphical form, in a tabular form. FIG. 21 illustrates a tabular report 2100 that displays link-by-link detail. Specifically, the exemplary tabular report 2100 lists may be generated for each of interfaces 1800, 1900 and 2000 described above, with one row of the report being dedicated to presenting information regarding the particular link. Furthermore, the rows within the report 2100 may be ordered by "worst-case" utilization. For example, with reference to the "worst-case" information presented by the interface 2000, the three links 2002 that are identified in the exemplary interface 200 as causing congestion are visually distinguished within the tabular reports 2100 (e.g., utilizing red "WC Util (%)" values). The tabular report 210 displays information regarding links, together with which SRLG failure caused the relevant link to constitute a "worst-case" failure, and which "worst-case" bandwidth level contributed to this state. This display allows users conveniently to identify problem links, and also to identify the situations (e.g., the SRLG failures and bandwidth levels) that contributed towards the problem, so that appropriate action can be taken (e.g., by performing a metric optimization utilizing the metric traffic engineering module 125, or by adding capacity to the identified problem links).

Figure 22:
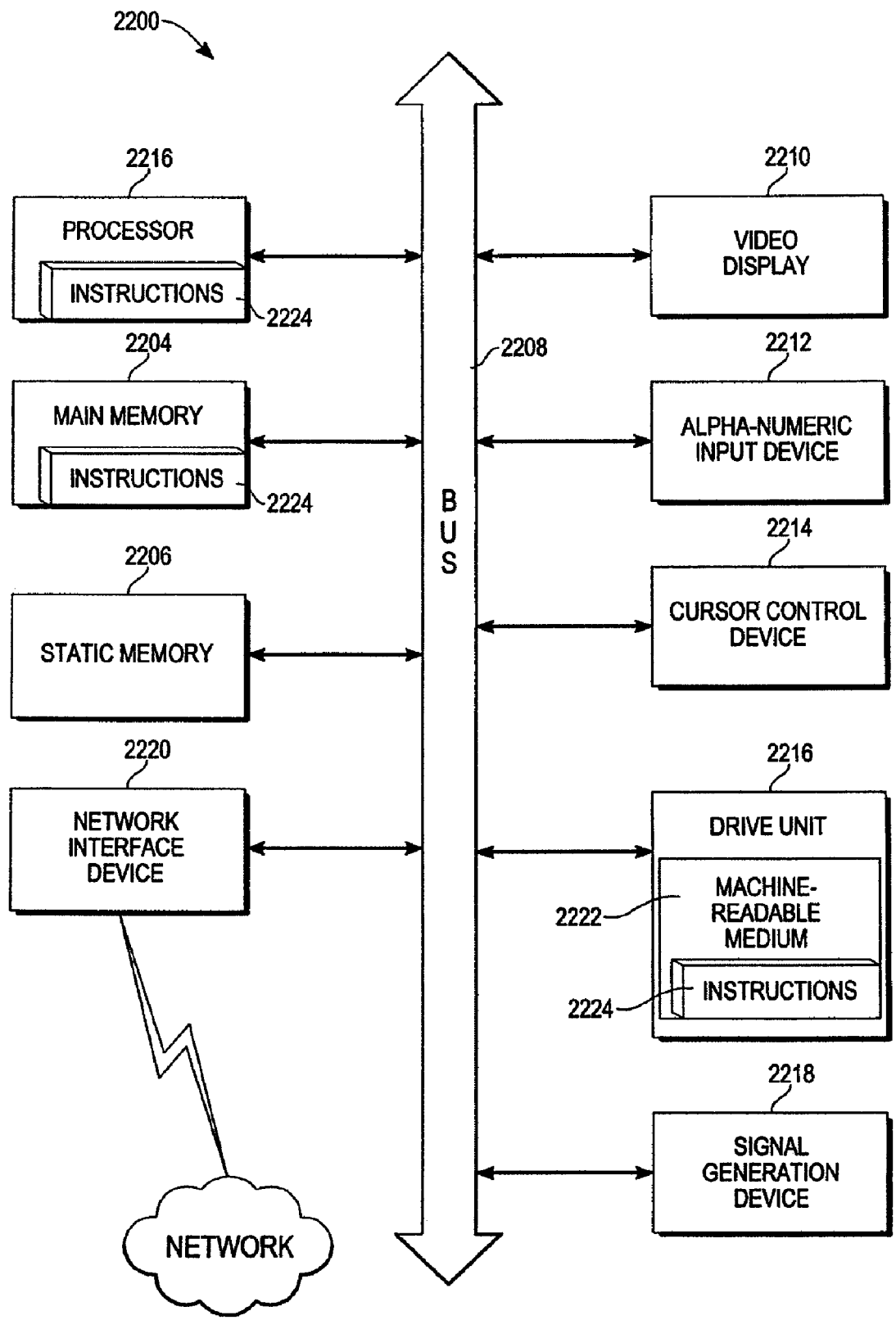
FIG. 22 shows a diagrammatic representation of machine in the exemplary form of a computer system within which a set of instructions, for causing the machine to perform any one or more of the methodologies and algorithms described herein, may be executed.

FIG. 22 shows a diagrammatic representation of machine in the exemplary form of a computer system 2200 within which a set of instructions, for causing the machine to perform any one or more of the methodologies and algorithms described herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 2200 includes a processor 2202 (e.g., a central processing unit (CPU) a graphics processing unit (GPU) or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard), a user interface (UI) navigation device 2214 (e.g., a mouse), a disk drive unit 2216, a signal generation device 2218 (e.g., a speaker) and a network interface device 2220.

The disk drive unit 2216 includes a machine-readable medium 2222 on which is stored one or more sets of instructions (e.g., software 2224) embodying any one or more of the methodologies, functions or algorithms described herein. The software 2224 may also reside, completely or at least partially, within the main memory 2204 and/or within the processor 2202 during execution thereof by the computer system 2200, the main memory 2204 and the processor 2202 also constituting machine-readable media.

The software 2224 may further be transmitted or received over a network 2226 via the network interface device 2220.

While the machine-readable medium 2292 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

In conclusion, the above-described exemplary embodiments of the present invention provide enhancements and additional functions, which are useful for the practical implementation of metric-based traffic engineering. For example, the various exemplary embodiments seek to address in the following practical challenges:

Point-to-point demand information can often only partially be inferred from measurements of utilizations on the network. The traffic engineering system 10 should be able to work with uncertain knowledge of these demands.

1. Intelligent routing of traffic is often of most use under a network failure, e.g., when one or more elements (links or nodes) in a network fails. Traffic, which would normally be routed through these elements, is then routed through shortest paths that do not contain these elements, leading to higher utilizations in the elements that have not failed. A choice of metrics for the network may be appropriate not only for the network under normal operation, but also under any one of a large number of these failure scenarios.
2. A large network will be attached to many edge devices and peering devices, all serving as individual sources and destinations for traffic. This can lead to an exponential increase in the size and complexity of the routing tables. Enhancements in the traffic engineering algorithms are useful for these algorithms to remain effective under large increases in complexity of this type.
3. While objective criteria, such as utilization levels, may be used to guide a traffic engineering procedure, more subjective criteria may also need to be taken account of, and for that reason a network visualization system to present views of the important decision criteria, even for large, complex networks, in a way that can be understood by a human, is useful.
4. Even once a new set of metrics is found which satisfies the traffic engineering requirements, a method to move the current network configuration step-by-step to the desired configuration, without interruption of the network activity, and with predictable and acceptable performance during the intermediate steps of this process, provides some benefit. The exemplary changeover system described above seeks to address this problem.

What is claimed is:

1. A system to optimize metrics associated with links of a network that is routed utilizing a shortest-path-first (SPF) routing method, the system including:

a processor;

a metric traffic engineering module, to identify at least one failure scenario applicable to the network, to identify at least one bandwidth level scenario applicable to point-to-point demands routed through the network, and to automatically calculate a metric for each of a plurality of links of the network, such that routings of demands through the network are optimized into the at least one failure scenario and into the at least one bandwidth level scenario, wherein the metric traffic engineering module being further configured to identify a plurality of failure scenarios and a plurality of bandwidth level scenarios applicable to the network, and to automatically calculate the metric for each of the plurality of links of the network such that the link utilizations resulting from demand routings determined by the metrics are below a predetermined threshold for each of the plurality of links of the network, for each of the plurality of failure scenarios, and for each of the plurality of bandwidth level scenarios; wherein the automatic metric calculation is further configured to calculate the metric for each of the plurality of links of the network such that a maximum link utilization for each of the plurality of links, for each of the plurality of failure scenarios, and for each of the plurality of bandwidth level scenarios, is minimized, and the minimization being performed over all possible choices of link metrics; and a changeover module coupled to the metric traffic engineering module, to signal network configuration changes to a network controller to rediscover the shortest path first routing through the network in accordance with the calculated metric for each of the plurality of links of the network.

2. The system of claim 1, wherein the at least one failure scenario is as a result of a voluntary action taken by a network operator to disable at least a portion of the network.

3. The system of claim 1, being further configured to apply the metric calculated for each of the plurality of links so as to route traffic within the network according to the calculated metrics.

4. The system of claim 1, being further configured to communicate the maximum link utilizations, over the at least one failure scenario and the at least one bandwidth level scenario, which result from an application of the automatically calculated metrics, for at least one link, to a user.

5. The system of claim 4, wherein the communication of the maximum link utilizations includes indicating whether at least one maximum link utilization exceeds a predetermined threshold link utilization.

6. The system of claim 4, wherein the communication of the maximum link utilizations includes generating a user interface in which at least one maximum link utilization is visually indicated.

7. The system of claim 1, being further configured to store the calculated metrics within the network so that the network is routed according to the stored metrics.

8. The system of claim 1, being further configured to identify the plurality of links of the network for which respective metrics are calculated as being core links of the network.

9. The system of claim 8, wherein sets of point-to-point demands are identified that follow a common routing through a core of the network for any choice of metrics of the core links, and demands are aggregated together and treated as a single demand in the automatic metric calculation.

10. A method to optimize metrics associated with links of a network that is routed utilizing a shortest-path-first (SPF) routing method, the method including:

identifying, by a processor, at least one failure scenario applicable to the network; identifying, by the processor, at least one bandwidth level scenario applicable to point-to-point demands routed through the network;

automatically calculating a metric for each of a plurality of links of a network, such that routings of demands through the network are optimized for the at least one failure scenario, and for the at least one bandwidth level scenario;

identifying a plurality of failure scenarios and a plurality of bandwidth level scenarios applicable to the network, and automatically calculating the metric for each of the plurality of links of the network such that the link utilizations resulting from demand routings determined by the metrics are below a predetermined threshold for each of the plurality of links of the network, for each of the plurality of failure scenarios, and for each of the plurality of bandwidth level scenarios;

wherein the automatic metric calculation is further configured to calculate the metric for each of the plurality of links of the network such that a maximum link utilization for each of the plurality of links, for each of the plurality of failure scenarios, and for each of the plurality of bandwidth level scenarios, is minimized, and the minimization being performed over all possible choices of link metrics; and signaling network configuration changes to a network controller to rediscover the shortest path first routing through the network in accordance with the calculated metric for each of the plurality of links of the network.

11. The method of claim 10, wherein the at least one failure scenario is as a result of a voluntary action taken by a network operator to disable at least a portion of the network.

12. The method of claim 10, including applying the metric calculated for each of the plurality of links in the shortest-path-first routing method so as to route traffic within the network according to the calculated metrics.

13. The method of claim 10, including communicating the maximum link utilizations, over the at least one failure scenario and the at least one bandwidth level scenario, which result from an application of the automatically calculated metrics, for at least one link, to a user.

14. The method of claim 13, wherein the communication of the maximum link utilizations includes indicating whether at least one maximum link utilization exceeds a predetermined threshold link utilization.

15. The method of claim 13, wherein the communication of the maximum link utilizations includes generating a user interface in which at least one maximum link utilization is visually indicated.

16. The method of claim 10, including storing the calculated metrics within the network so that the network is routed, utilizing the shortest-path-first routing method, according to the stored metrics.

17. The method of claim 10, including identifying the plurality of links of the network for which respective metrics are calculated as being core links of the network.

18. The method of claim 17, wherein sets of point-to-point demands are identified that follow a common routing through a core of the network for any choice of metrics of the core links, and demands are aggregated together and treated as a single demand in the automatic metric calculation.

* * * * *

UNITED STATES PATENT AND TRADEMARK OFFICE
CERTIFICATE OF CORRECTION

PATENT NO. : 7,782,773 B2                                                Page 1 of 2
APPLICATION NO. : 12/023957
DATED : August 24, 2010
INVENTOR(S) : Alan T. Gous It is certified that error appears in the above-identified patent and that said Letters Patent is hereby corrected as shown below:

On Sheet 5 of 23, in figure 4, Reference Numeral 400, line 3, delete "S(I)m D(I)," and insert -- S(I)m, D(I), --, therefor.

On Sheet 5 of 23, in figure 4, Reference Numeral 415, line 2, delete "U(j.k.b)" and insert -- U(j,k,b) --, therefor.

On Sheet 5 of 23, in figure 4, Reference Numeral 450, line 2, delete "j.k.b." and insert -- j,k,b. --, therefor.

On Sheet 8 of 23, in figure 7, Reference Numeral 730, line 2, delete "th" and insert -- the --, therefor.

On Sheet 8 of 23, in figure 7, Reference Numeral 725, line 1, delete "(S(I).D(I)" and insert -- S(I), D(I) --, therefor.

On Sheet 12 of 23, in figure 11, Reference Numeral 1125, line 1, delete "MATRIC" and insert -- METRIC --, therefor.

On Sheet 17 of 23, in figure 16, Reference Numeral 1605, line 4, delete "utilitzations" and insert -- utilizations --, therefor.

In column 2, line 11, after "invention" insert -- . --.

In column 2, line 15, after "plan" insert -- . --.

In column 2, line 21, after "structure" insert -- . --.

In column 2, line 24, after "invention" insert -- . --.

In column 2, line 27, after "plan" insert -- . --.

In column 2, line 31, after "structure" insert -- . --.

Signed and Sealed this

Seventh Day of December, 2010

David J. Kappos
*Director of the United States Patent and Trademark Office*

In column 2, line 55, after "invention" insert -- . --.

In column 2, line 59, after "system" insert -- . --.

In column 2, line 63, after "demand" insert -- . --.

In column 2, line 67, after "variations" insert -- . --.

In column 3, line 3, after "invention" insert -- . --.

In column 3, line 19, after "details" insert -- . --.

In column 4, line 30, delete "1." and insert -- 1 --, therefor.

In column 10, line 49, delete "j_0" and insert -- (j_0 --, therefor.

In column 17, line 18, after "possible" insert -- . --.

In column 22, line 55, in Claim 1, delete "module," and insert -- module --, therefor.